United States Patent
Su et al.

(10) Patent No.: US 12,349,092 B2
(45) Date of Patent: Jul. 1, 2025

(54) METHOD AND APPARATUS FOR SIGNAL PROCESSING IN A WIRELESS COMMUNICATION SYSTEM

(71) Applicant: Samsung Electronics Co., Ltd., Gyeonggi-do (KR)

(72) Inventors: Di Su, Beijing (CN); Chen Qian, Beijing (CN); Peng Lin, Beijing (CN); Bin Yu, Beijing (CN)

(73) Assignee: Samsung Electronics Co., Ltd (KR)

( * ) Notice: Subject to any disclaimer, the term of this patent is extended or adjusted under 35 U.S.C. 154(b) by 484 days.

(21) Appl. No.: 17/925,726

(22) PCT Filed: Jun. 18, 2021

(86) PCT No.: PCT/KR2021/007687
§ 371 (c)(1),
(2) Date: Nov. 16, 2022

(87) PCT Pub. No.: WO2021/256897
PCT Pub. Date: Dec. 23, 2021

(65) Prior Publication Data
US 2023/0180165 A1 Jun. 8, 2023

(30) Foreign Application Priority Data

Jun. 19, 2020 (CN) .......................... 202010568086.3
Aug. 14, 2020 (CN) .......................... 202010820492.4

(51) Int. Cl.
*H04W 56/00* (2009.01)
*H04L 27/26* (2006.01)

(52) U.S. Cl.
CPC ..... *H04W 56/0045* (2013.01); *H04L 27/2663* (2013.01); *H04L 27/2691* (2013.01); *H04W 56/005* (2013.01)

(58) Field of Classification Search
CPC ............ H04W 56/0045; H04W 56/005; H04L 27/2663; H04L 27/2691
See application file for complete search history.

(56) References Cited

U.S. PATENT DOCUMENTS 10,425,215 B2    9/2019   Lee et al.
2010/0322299 A1* 12/2010  Draving .............. H04L 25/0305
                                                    375/232
(Continued)

FOREIGN PATENT DOCUMENTS

CN    105812116    7/2016
CN    110677365    1/2020
(Continued)

OTHER PUBLICATIONS

Amjad et al., "A Low-Complexity Full-Duplex Radio Implementation with a Single Antenna", IEEE Transactions on Vehicular Technology, vol. 67. No. 3, Mar. 2018, 13 pages.
(Continued)

*Primary Examiner* — Redentor Pasia
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). The present disclosure provides a device in a wireless communication system and a method performed by the device. The method comprises: for a first transmitted signal transmitted by the device and a first received signal corresponding to the first transmitted signal and received by the device, compensating one of the first transmitted signal and the first received signal, according to a first synchronization delay part of a synchronization delay between a receiver and a transmitter of the device, wherein the first synchronization delay part is an integral multiple of
(Continued)

a predefined baseband sampling interval of the device in the synchronization delay; determining a second synchronization delay part of the synchronization delay based on one of a collection of the first received signal and the compensated first transmitted signal and a collection of the first transmitted signal and the compensated first received signal, depending on which one of the first transmitted signal and the first received signal is compensated, wherein the second synchronization delay part is a fractional multiple of the predefined baseband sampling interval of the device in the synchronization delay.

14 Claims, 21 Drawing Sheets

(56) References Cited

U.S. PATENT DOCUMENTS

| | | | | |
|---|---|---|---|---|
| 2017/0180055 | A1* | 6/2017 | Yu | H04J 14/06 |
| 2017/0187415 | A1* | 6/2017 | Choi | H04B 1/10 |
| 2017/0230207 | A1* | 8/2017 | Holguin-Sanchez | H04L 5/001 |
| 2018/0006859 | A1* | 1/2018 | Ibrahim | H04L 5/0007 |
| 2018/0109410 | A1* | 4/2018 | Kim | H04L 27/2613 |
| 2019/0349157 | A1* | 11/2019 | Datta | H04L 27/2695 |
| 2021/0321417 | A1* | 10/2021 | Kim | H04L 5/0048 |

FOREIGN PATENT DOCUMENTS

| | | |
|---|---|---|
| KR | 10-2017-0006449 | 1/2017 |
| KR | 10-2018-0111915 | 10/2018 |

OTHER PUBLICATIONS

Dani Korpi et al., "Full-Duplex Mobile Device: Pushing the Limits", Radio Communications, IEEE Communications Magazine, Sep. 2016, 8 pages.
Dinesh Bharadia et al., "Full Duplex Radios", SIGCOMM'13, Aug. 12-16, 2013, 12 pages.
Min Soo Sim et al., "Nonlinear Self-Interference Cancellation for Full-Duplex Radios: From Link-Level and System-Level Performance Perspectives", IEEE Communications Magazine, Sep. 2017, 10 pages.
European Search Report dated Oct. 26, 2023 issued in counterpart application No. 21827072.6-1203, 20 pages.
PCT/ISA/210 Search Report issued on PCT/KR2021/007687, Oct. 1, 2021 pp. 4.
PCT/ISA/237 Written Opinion issued on PCT/KR2021/007687, Oct. 1, 2021, pp. 3.
Salma Elsherif et al., "Full Duplex Radio in High Density Future Wireless Communication Networks", 2019 IEEE International Symposium on Signal Processing and Information Technology (ISSPIT), Dec. 2019, pp. 6.
Haolin Li et al., "Self-Interference Cancellation Enabling High-Throughput Short-Reach Wireless Full-Duplex Communication", IEEE Transactions on Wireless Communications, vol 17, No. 10, pp. 6475-6486, Oct. 2018, pp. 13.
Ruwu Xiao et al., "On the Design of Full Duplex Wireless System With Chaotic Sequences", Discrete and Continuous Dynamical Systems Series, vol. 12, No. 4&5, Sep. 2019, pp. 783-793.
Chenxing Li et al., "Digital Self-Interference Cancellation with Variable Fractional Delay FIR Filter for Full-Duplex Radios", vol. 22, No. 5, May 2018, 4 pages.
European Search Report dated Jun. 19, 2023 issued in counterpart application No. 21827072.6-1203, 18 pages.

* cited by examiner

【Figure 1】
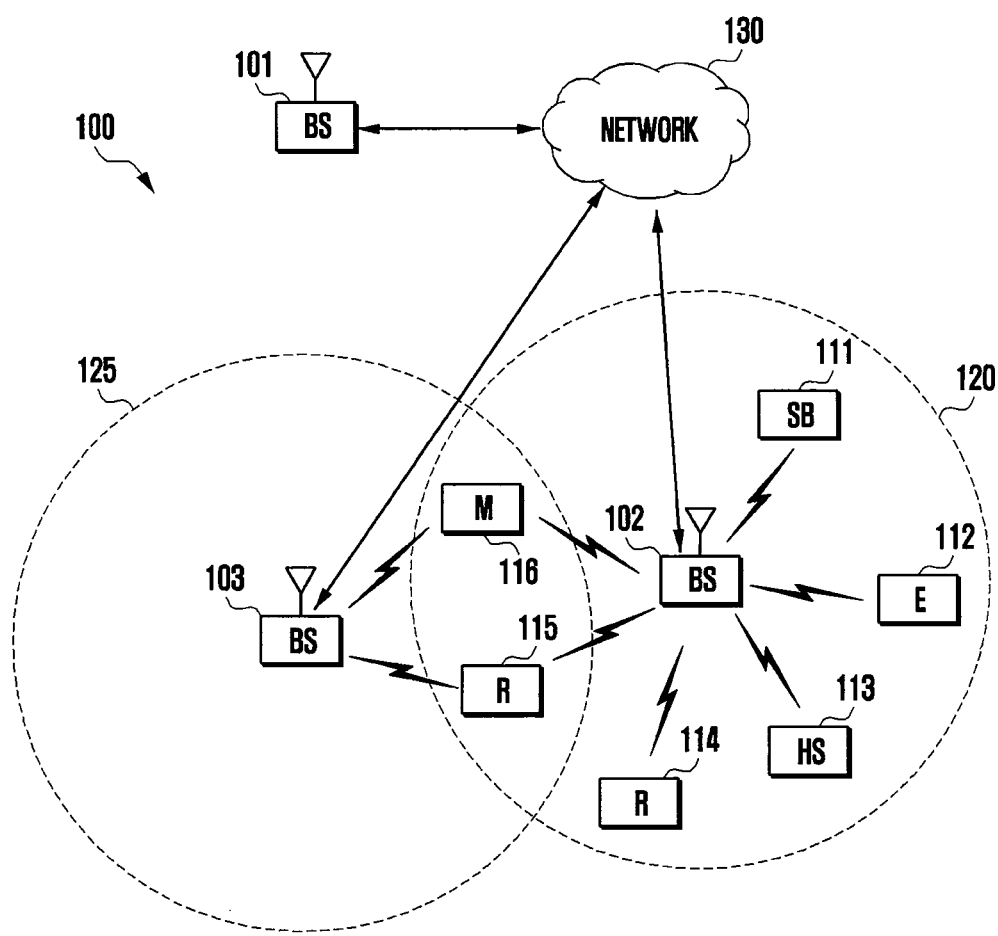

[Figure 3a]
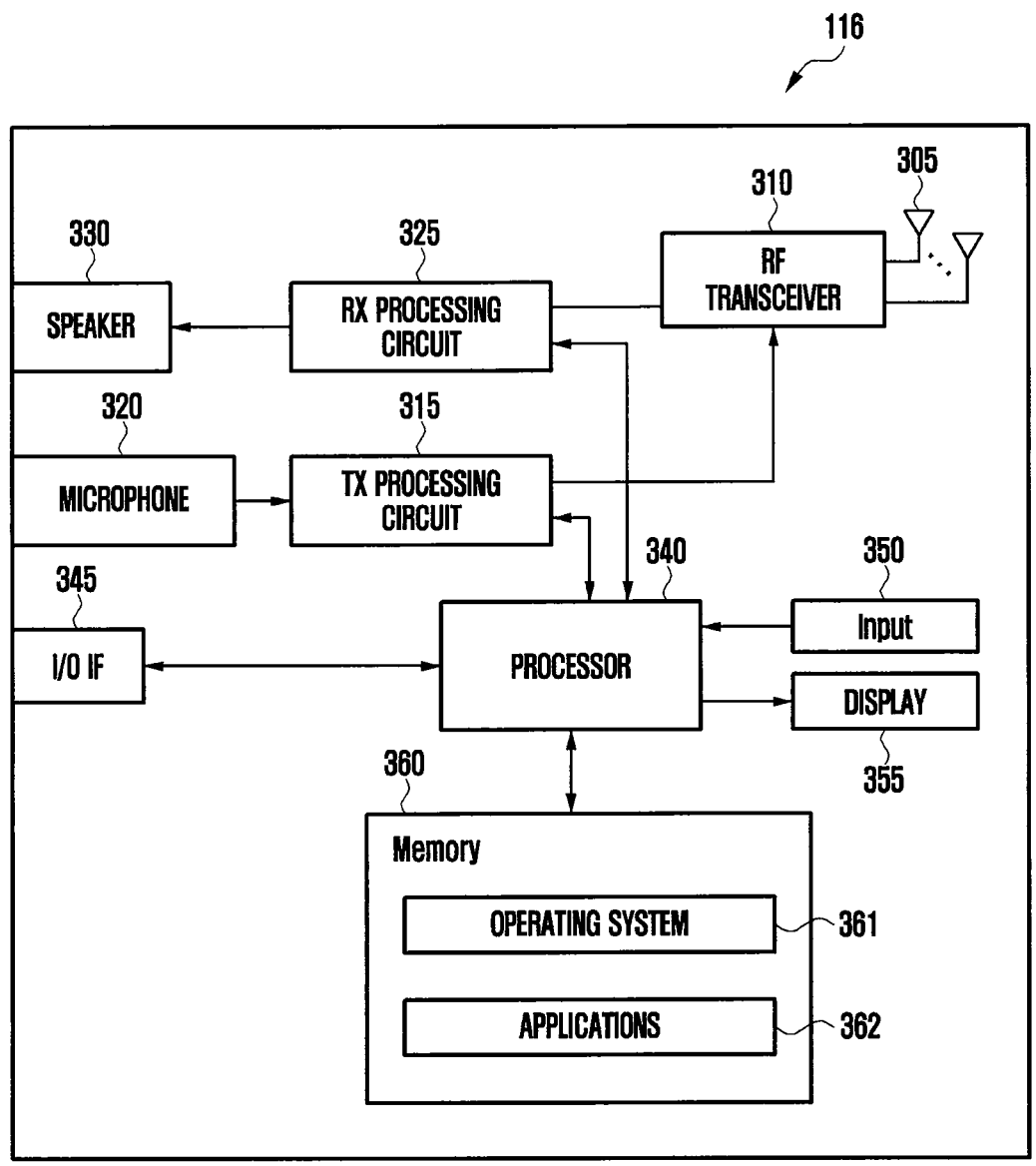

[Figure 3b]
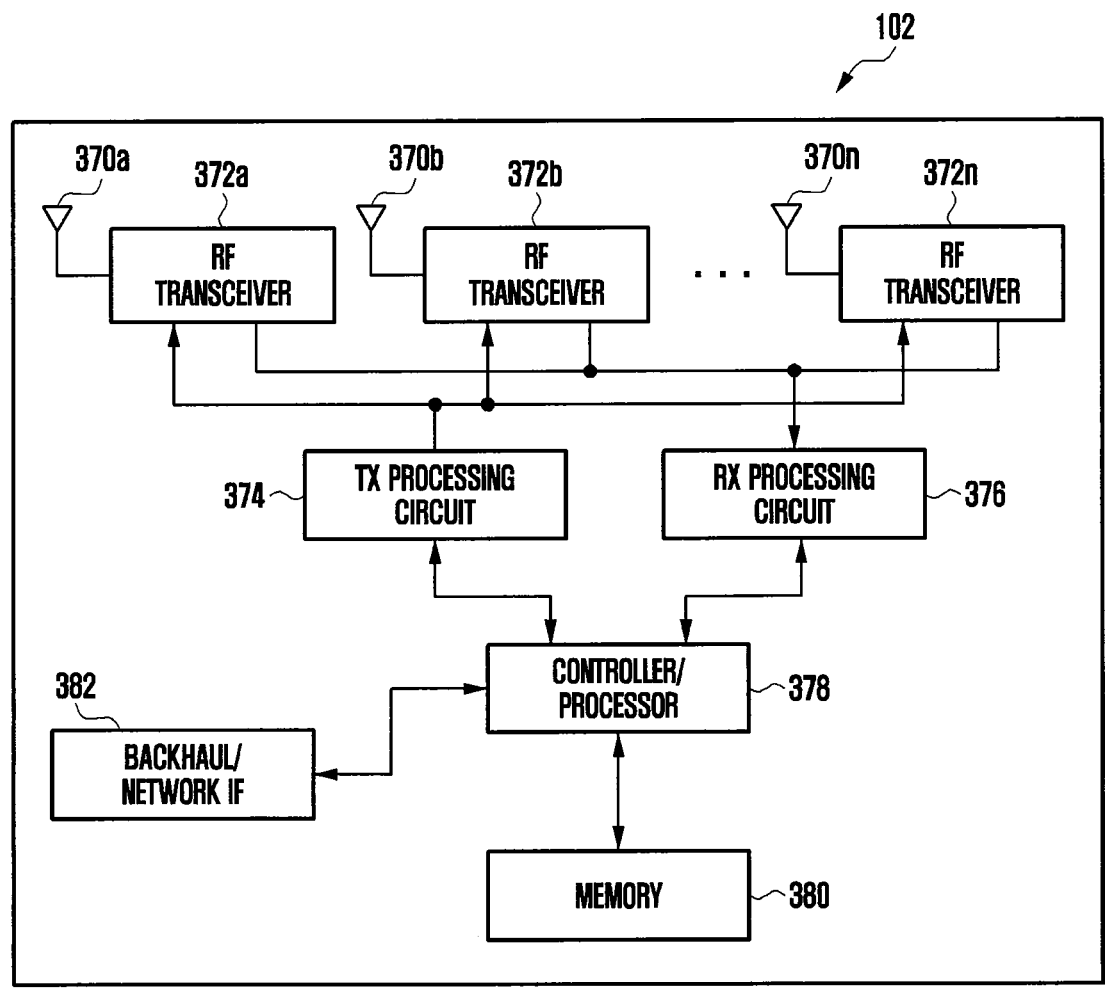

【Figure 4】
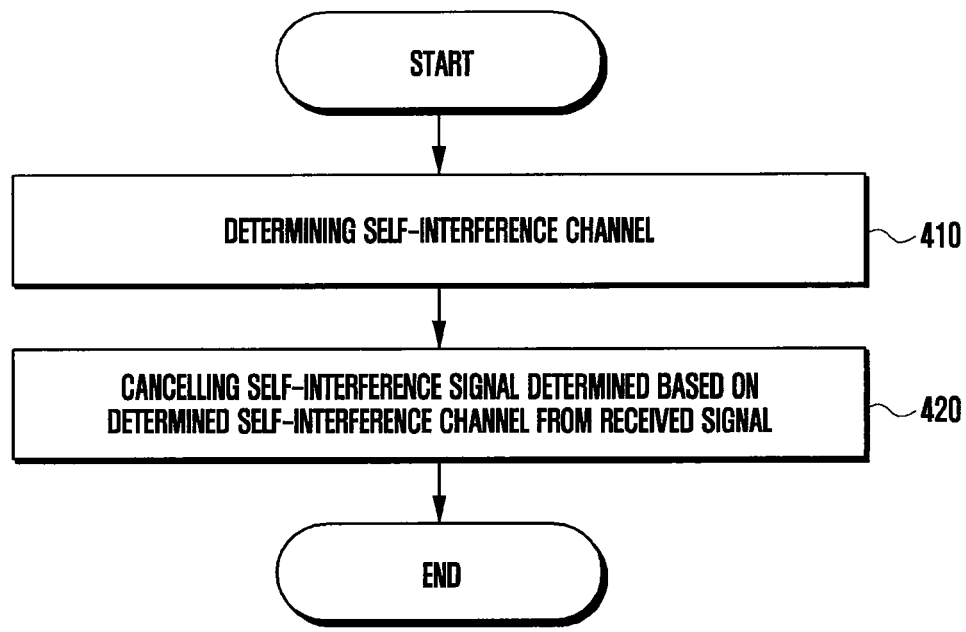

[Figure 5a]
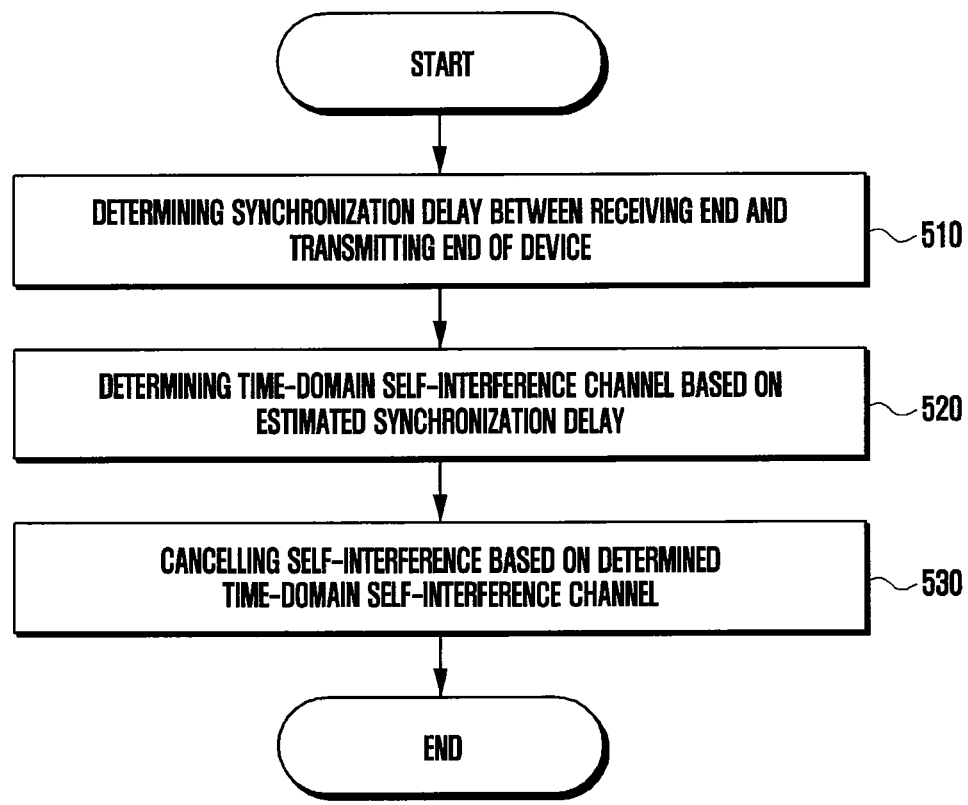

[Figure 5b]
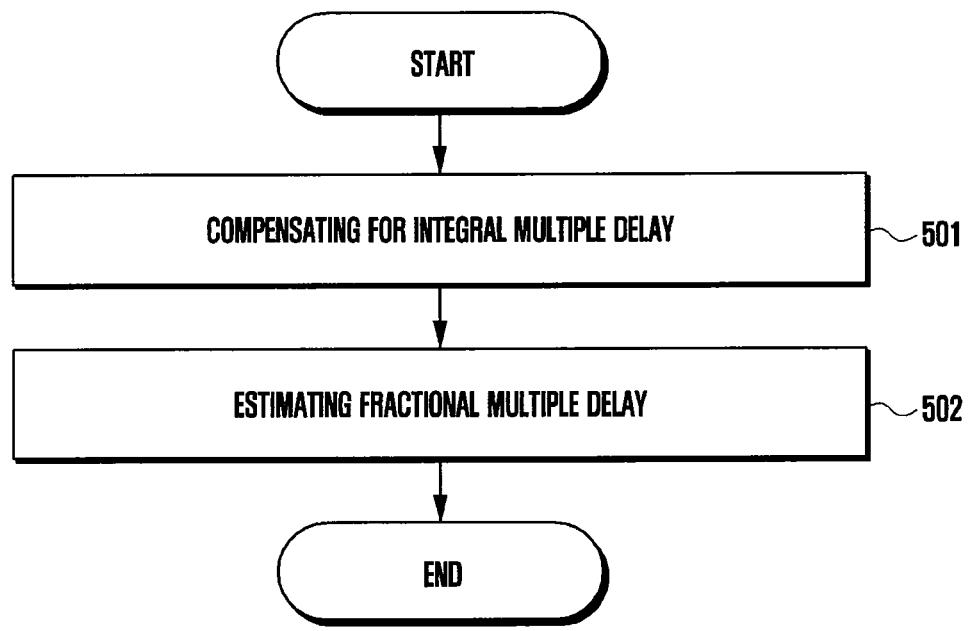

[Figure 6a]
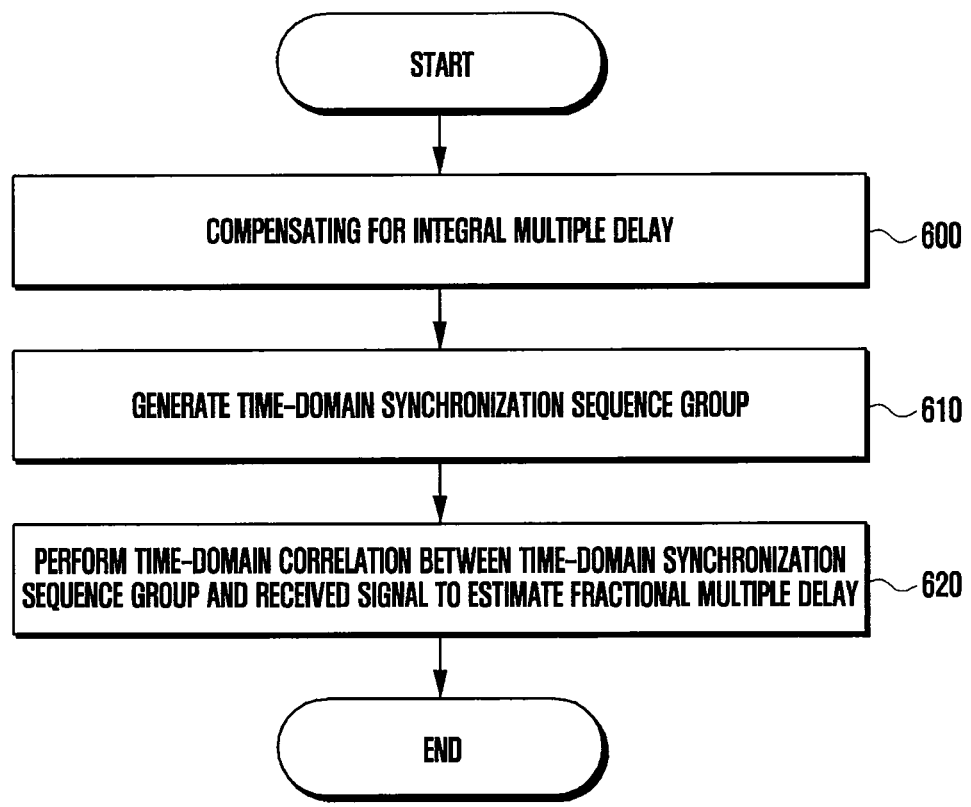

[Figure 6b]
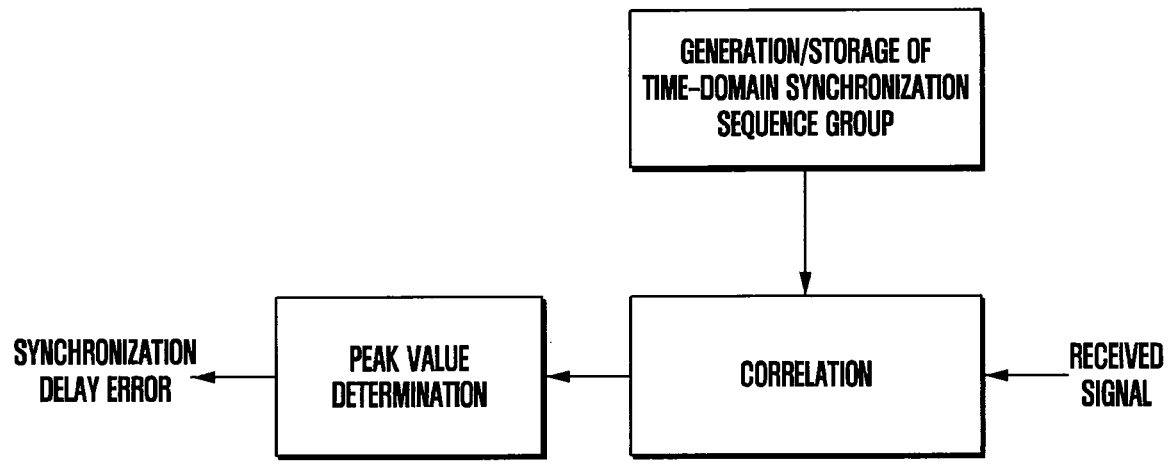

[Figure 7]
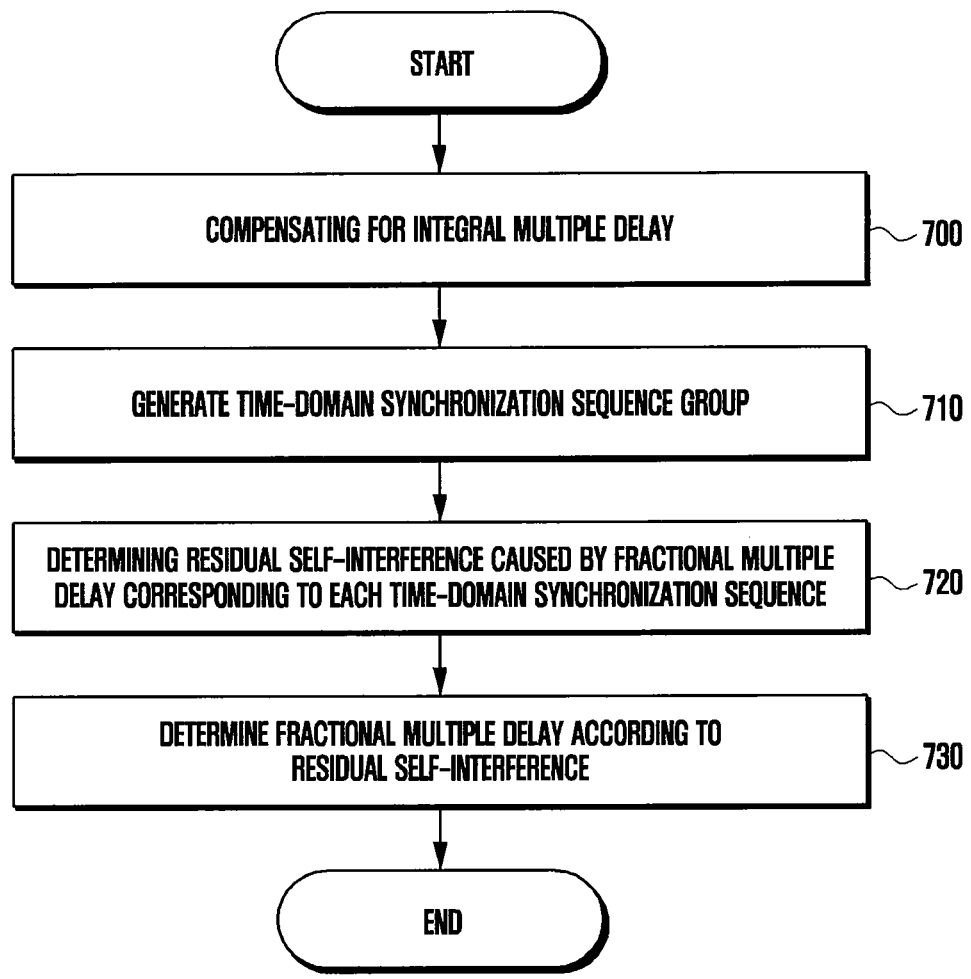

[Figure 8a]
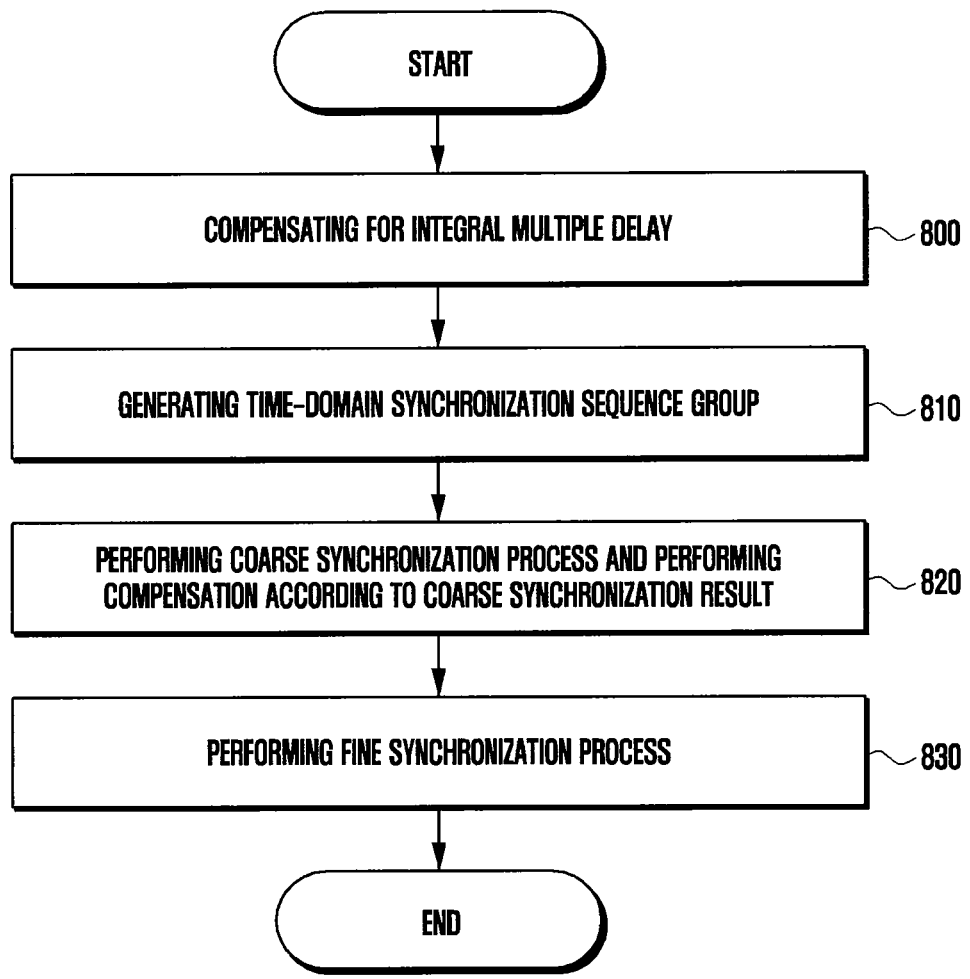

[Figure 9]
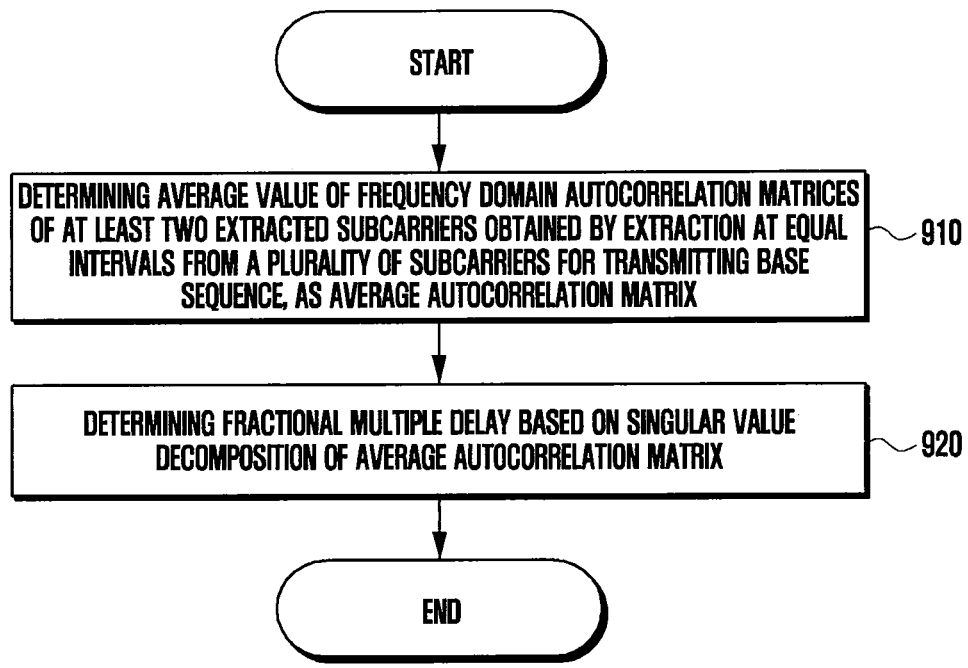

[Figure 10]
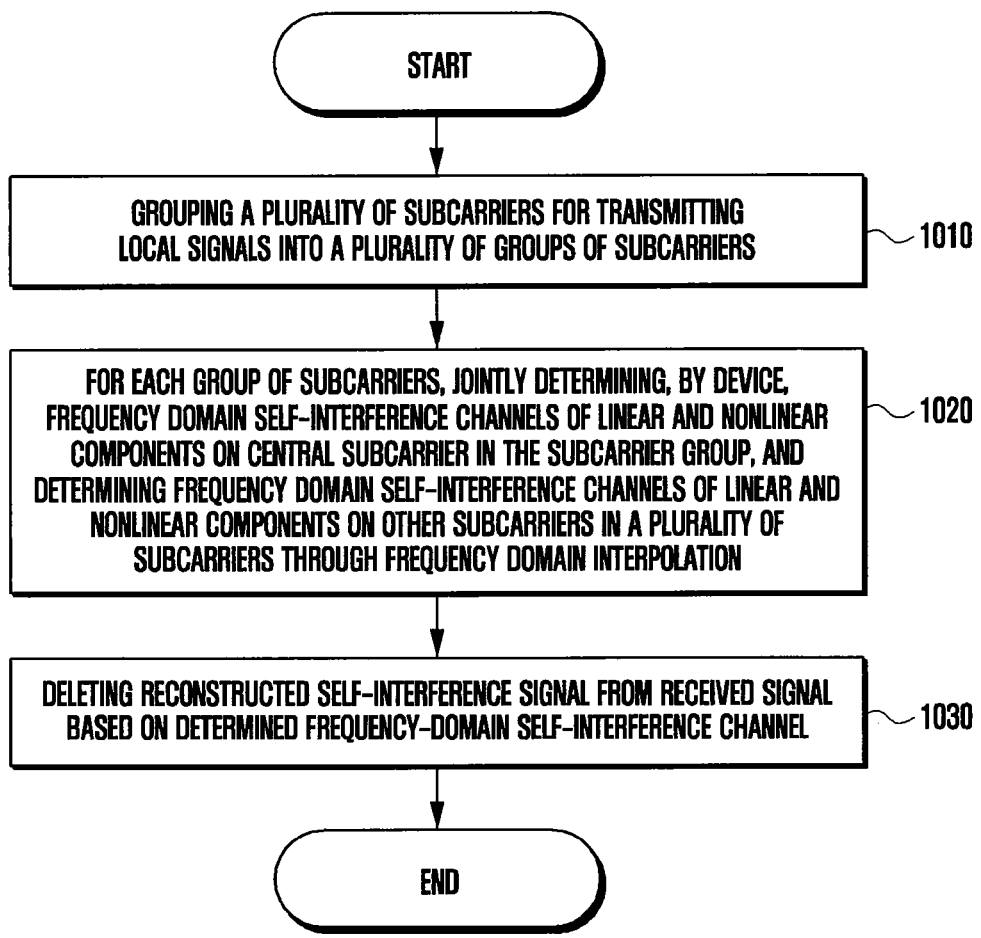

[Figure 11]
☐ Demodulation reference signal
▨ Phase tracking reference signal

[Figure 12]
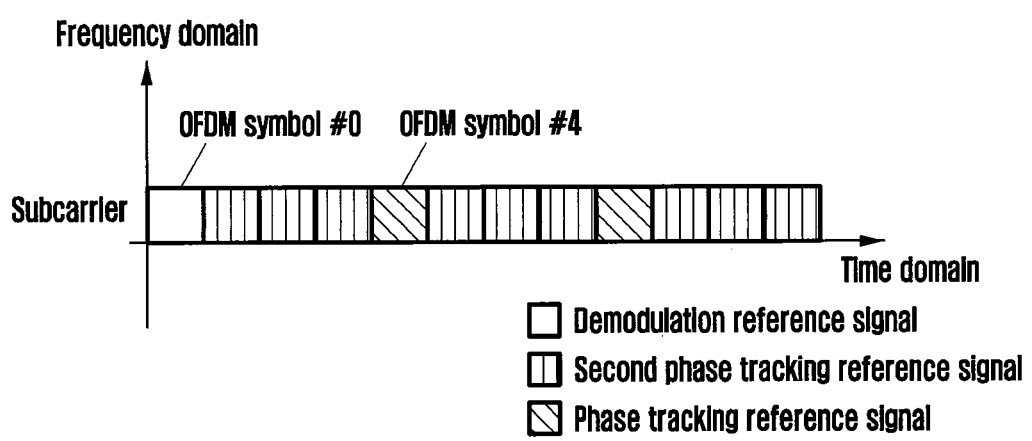

[Figure 13]
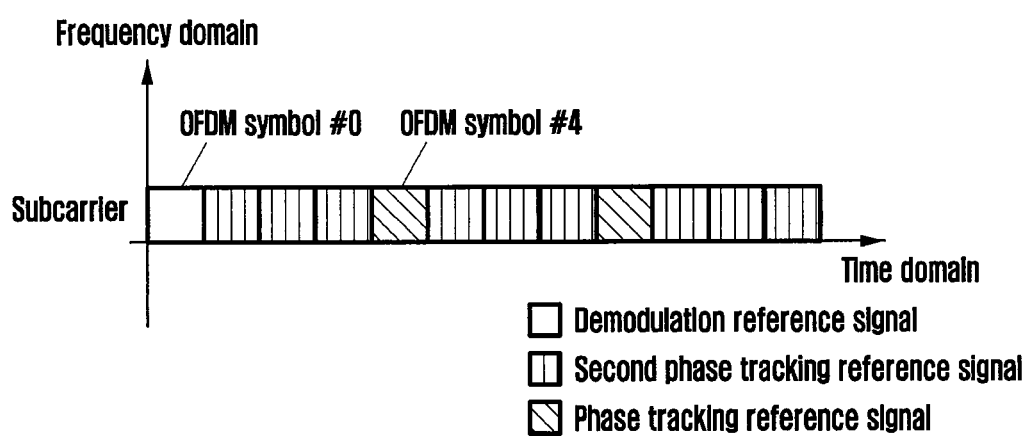

[Figure 14]
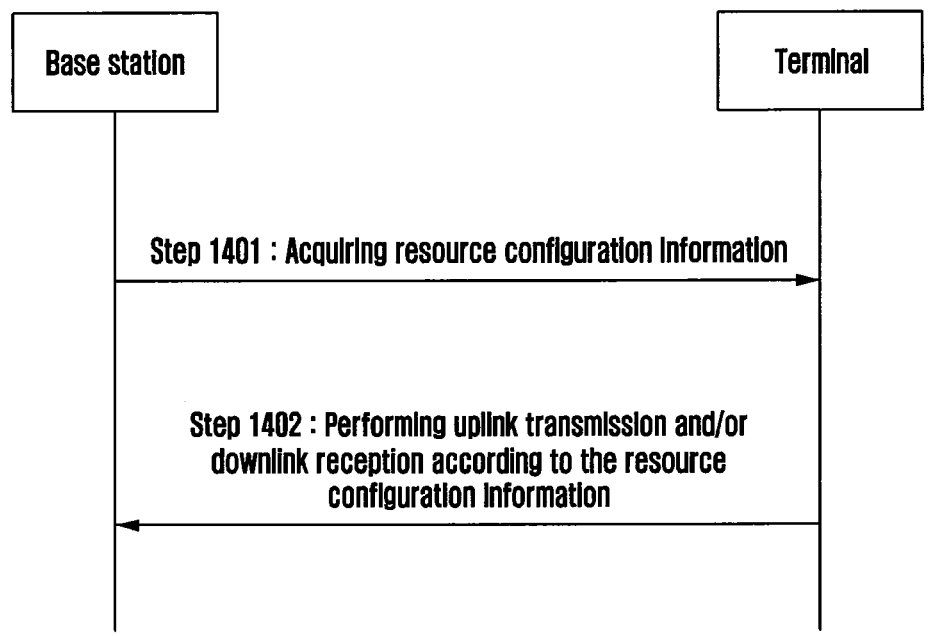

[Figure 15]
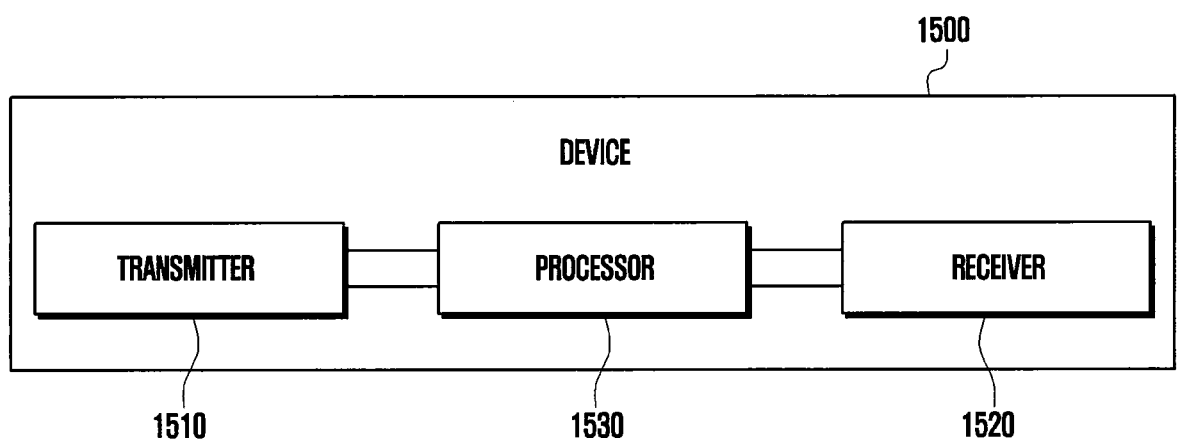

METHOD AND APPARATUS FOR SIGNAL PROCESSING IN A WIRELESS COMMUNICATION SYSTEM

PRIORITY

This application is a National Phase Entry of PCT International Application No. PCT/KR2021/007687, which was filed on Jun. 18, 2021, and claims priority to Chinese Patent Application Nos. 202010568086.3 and 202010820492.4, which were filed on Jun. 19, 2020 and Aug. 14, 2020, respectively, the entire content of each of which is incorporated herein by reference.

TECHNICAL FIELD

The present invention relates to the technical field of wireless communication, in particular to the design of a transceiver. Also, the present invention relates to the field of wireless communication technology, and more specifically to reference signals of a communication system, physical resource configuration and corresponding physical channels, and a transmission method of the reference signals.

BACKGROUND ART

In order to meet the increasing demand for wireless data communication services since the deployment of 4G communication systems, efforts have been made to develop improved 5G or pre-5G or 6G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Also, considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE

Technical Problem

Compared with 5G systems, 6G systems may be implemented in higher frequency bands to achieve a higher data rate.

As estimated by ITU, global monthly mobile data traffic will reach 62 Exa Bytes (1 EB=$2^{30}$ GB) by 2020, and from 2020 to 2030, global mobile data services will grow at an annual rate of about 55%. In addition, proportions of video services and machine-to-machine communication services in mobile data services will gradually increase. By 2030, video services will be six times of non-video services, while machine-to-machine communication services will account for about 12% of mobile data services ("IMT Traffic Estimates for the Years 2020 to 2030, Report ITU-R M.2370-0").

The rapid growth of mobile data services, especially the exponential growth of high-definition video and ultra-high-definition video services, puts forward higher requirements for a transmission rate of wireless communication. In order to meet the growing demand for mobile services, new technologies need to be proposed on the basis of 4G, 5G or 6G to further improve the transmission rate and throughput of wireless communication systems. Full-duplex technologies may further improve spectrum utilization in existing systems. Unlike a traditional half-duplex system, which adopts orthogonal division in time-domain (Time Division Duplex, TDD) or frequency-domain (Frequency Division Duplex, FDD) in uplink and downlink, a full-duplex system allows users' uplink and downlink to be transmitted simultaneously in time-domain and frequency-domain. Therefore, the full-duplex system may theoretically achieve twice the throughput of the half-duplex system. However, because the uplink and downlink are on the same frequency and at the same time, transmitted signals of the full-duplex system will produce strong self-interference to received signals of the full-duplex system, and a self-interference signal will even be more than 120 dB higher than a bottom noise. Therefore, in order to enable the full-duplex system to work, a key problem is to design a scheme to eliminate the self-interference, reducing the strength of the self-interference signal to at least a same level as that of the bottom noise.

Technical Solution

An aspect of the present disclosure provides a method performed by a device in a wireless communication system, comprising: for a first transmitted signal transmitted by the device and a first received signal corresponding to the first transmitted signal and received by the device, compensating one of the first transmitted signal and the first received signal, according to a first synchronization delay part of a synchronization delay between a receiver and a transmitter of the device, wherein the first synchronization delay part is an integral multiple of a predefined baseband sampling interval of the device in the synchronization delay; determining a second synchronization delay part of the synchronization delay, based on one of a collection of the first received signal and the compensated first transmitted signal and a collection of the first transmitted signal and the compensated first received signal, depending on which one of the first transmitted signal and the first received signal is compensated, wherein the second synchronization delay part is a fractional multiple of the predefined baseband sampling interval of the device in the synchronization delay.

Another aspect of the present disclosure provides a method performed by a device in a wireless communication system, comprising: grouping a plurality of subcarriers for transmitting a transmitted signal into a plurality of groups of subcarriers; for each group of subcarriers, jointly determining frequency-domain self-interference channels of linear and nonlinear components on the central subcarriers in the groups of subcarriers, and determining frequency-domain self-interference channels of linear and nonlinear components on other subcarriers in the plurality of subcarriers through frequency-domain interpolation; and deleting a reconstructed self-interference signal from the received signal based on the determined frequency-domain self-interference channels.

Yet another aspect of the present disclosure provides a device in a wireless communication system, comprising: a transmitter configured to transmit a signal; a receiver configured to receive a signal; and a controller configured to, for a first transmitted signal transmitted by the transmitter and a first received signal corresponding to the first transmitted signal and received by the receiver, compensate one of the first transmitted signal and the first received signal, according to a first synchronization delay part of a synchronization delay between the receiver and the transmitter of the device, wherein the first synchronization delay part is an integral multiple of a predefined baseband sampling interval of the device in the synchronization delay; determining a second synchronization delay part of the synchronization delay based on one of a collection of the first received signal and the compensated first transmitted signal and a collection of the first transmitted signal and the compensated first received signal, depending on which one of the first transmitted signal and the first received signal is compensated, wherein the second synchronization delay part is a fractional multiple of the predefined baseband sampling interval of the device in the synchronization delay.

Yet another aspect of the present disclosure provides a device in a wireless communication system, comprising: a transmitter configured to transmit a signal; a receiver configured to receive a signal; and a controller configured to group a plurality of subcarriers for transmitting a transmitted signal into a plurality of groups of subcarriers; for each group of subcarriers, jointly determine frequency-domain self-interference channels of linear and nonlinear components on the central subcarriers in the groups of subcarriers, and determine frequency-domain self-interference channels of linear and nonlinear components on other subcarriers in the plurality of subcarriers through frequency-domain interpolation; and deleting a reconstructed self-interference signal from the received signal based on the determined frequency-domain self-interference channels.

According to an aspect of the present disclosure, there is provided a method executed by a user terminal in a wireless communication system, comprising: acquiring resource configuration information from a base station; and performing uplink transmission and/or downlink reception based on the acquired resource configuration information.

According to another aspect of the present disclosure, there is provided a terminal, comprising: a transceiver; and a processor configured to control the transceiver to execute the following method of: acquiring resource configuration information from a base station; and performing uplink transmission and/or downlink reception based on the acquired resource configuration information. In an embodiment, the resource configuration information is used to configure a reference signal, the physical resource to which the reference signal is mapped is different from the physical resource to which a phase tracking reference signal (PTRS) with the same transmission direction is mapped in at least one of the time domain or the frequency domain, and wherein the transmission direction is at least one of uplink and downlink. In another embodiment, the resource configuration information is information about an invalid resource configuration, wherein the invalid resource configuration is a subcarrier-level invalid resource configuration.

According to another aspect of the present disclosure, there is provided a method executed by a base station in a wireless communication system, comprising: generating resource configuration information; and transmitting the resource configuration information to a terminal, so that the terminal executes the above method.

According to another aspect of the present disclosure, there is provided a base station in a wireless communication system, comprising: a transceiver; and a processor configured to generate resource configuration information and control the transceiver to transmit the resource configuration information to a terminal, so that the terminal executes the above method. In various specific embodiments, the resource configuration information includes at least one of the following: resource configuration information about the reference signal; and information about invalid resource configuration.

When the resource configuration information is used for a downlink reference signal, the base station transmits the downlink reference signal to the terminal; and when the resource configuration information is used for an uplink reference signal, the base station receives the uplink reference signal from the terminal, and/or receives other uplink transmissions affected by the configuration of the uplink reference signal.

Advantageous Effects

According to an embodiment of the present invention, wireless communication between a terminal and a network can be performed more efficiently.

DESCRIPTION OF DRAWINGS

FIG. 1 is an exemplary wireless network according to various embodiments of the present disclosure.

FIG. 3a illustrates an example UE according to the present disclosure.

FIG. 3b illustrates an example gNB according to the present disclosure.

FIG. 4 illustrates a self-inference cancellation method of a device according to an embodiment of the present disclosure.

FIG. 5a illustrates an example method for performing self-interference cancellation in the time domain according to an embodiment of the present disclosure.

FIG. 5b illustrates an example method for estimating fractional multiple delay according to an embodiment of the present disclosure.

FIG. 6a illustrates an example method for estimating fractional multiple delay according to an embodiment of the present disclosure.

FIG. 6b illustrates a block diagram of implementation of the method for estimating fractional multiple delay shown in FIG. 6a.

FIG. 7 illustrates another example method for estimating fractional multiple delay according to an embodiment of the present disclosure.

FIG. 8a illustrates another example method for estimating fractional multiple delay according to an embodiment of the present disclosure.

FIG. 8b illustrates a block diagram of implementation of the method for estimating fractional multiple delay shown in FIG. 8a.

FIG. 8c illustrates another block diagram of implementation of the method for estimating fractional multiple delay shown in FIG. 8a.

FIG. 9 illustrates another example method for estimating fractional multiple delay according to an embodiment of the present disclosure.

FIG. 10 illustrates an example method for performing self-interference cancellation in the frequency domain according to an embodiment of the present disclosure.

FIG. 11 illustrates a transmission example of a phase tracking reference signal (PTRS) according to the prior art;

FIG. 12 illustrates a transmission example in which a phase tracking reference signal and a second phase tracking reference signal are used together for phase tracking according to an embodiment of the present disclosure;

FIG. 13 illustrates a second phase tracking reference signal and a phase tracking reference signal with different frequency domain densities according to an embodiment of the present disclosure; and FIG. 14 illustrates a flow chart of a signal configuration and transmission method according to an embodiment of the present disclosure.

FIG. 15 illustrates a device in a wireless communication system.

MODE FOR INVENTION

Figure 2A:
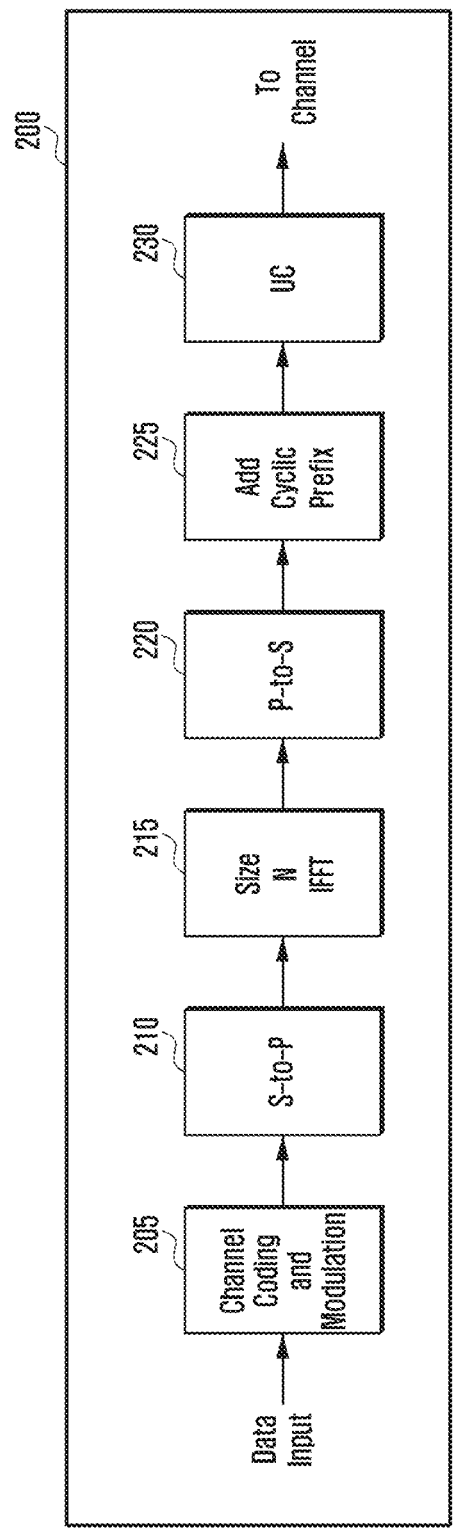
FIG. 2a illustrates an example wireless transmission path according to the present disclosure.

The embodiments are described below only by referring to the accompanying drawings to explain various aspects. As used herein, the term "and/or" includes any and all combinations of one or more of the associated items listed. Expressions such as "at least one" and "at least a", when preceding the element list, modify the entire element list instead of modifying individual elements of the list, so that the expression "at least one of a, b, and c" or similar expressions include only a, only b, only c, only a and b, only a and c, only b and c, and all of a, b and c.

The terms used in this specification will be briefly described, and the present disclosure will be described in detail.

Regarding the terms in the various embodiments of the present disclosure, in consideration of the functions of the structural elements in the various embodiments of the present disclosure, general terms that are currently widely used are chose. However, the meanings of terms can be changed according to intentions, judicial precedents, the emergence of new technologies, etc. In addition, in some cases, terms that are not commonly used can be chose. In this case, the meanings of the terms will be described in detail in the corresponding part in the description of the present disclosure. Therefore, the terms used in the various embodiments of the present disclosure should be defined based on the meanings and description of the terms provided herein.

Any embodiment disclosed herein can be combined with any other embodiment, and references to "embodiments", "some embodiments", "alternative embodiments", "various embodiments", "one embodiment", etc. are not necessarily mutually exclusive, but are intended to indicate that a particular feature, structure or characteristic described in connection with this embodiment may be included in at least one embodiment. Such terms used herein do not necessarily all refer to the same embodiment. Any embodiment may be combined inclusively or exclusively with any other embodiment in a manner consistent with the aspects and embodiments disclosed herein.

References to "or" can be construed as inclusive, so that any term described using "or" can indicate any one of a single, more than one, and all of the items.

Terms including ordinal numbers (such as first, second, etc.) can be used to describe various elements, but these elements are not limited by terms. The above terms are only used to distinguish one element from another. For example, without departing from the scope of the present disclosure, the first element may be referred to as the second element, and similarly, the second element may also be referred to as the first element. The term "and/or" includes any combination of multiple related items or any one of the multiple related items.

FIG. 1 shows an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. GNB 101 communicates with gNB 102 and gNB 103. GNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); and a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 6G, 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 shows an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2B:
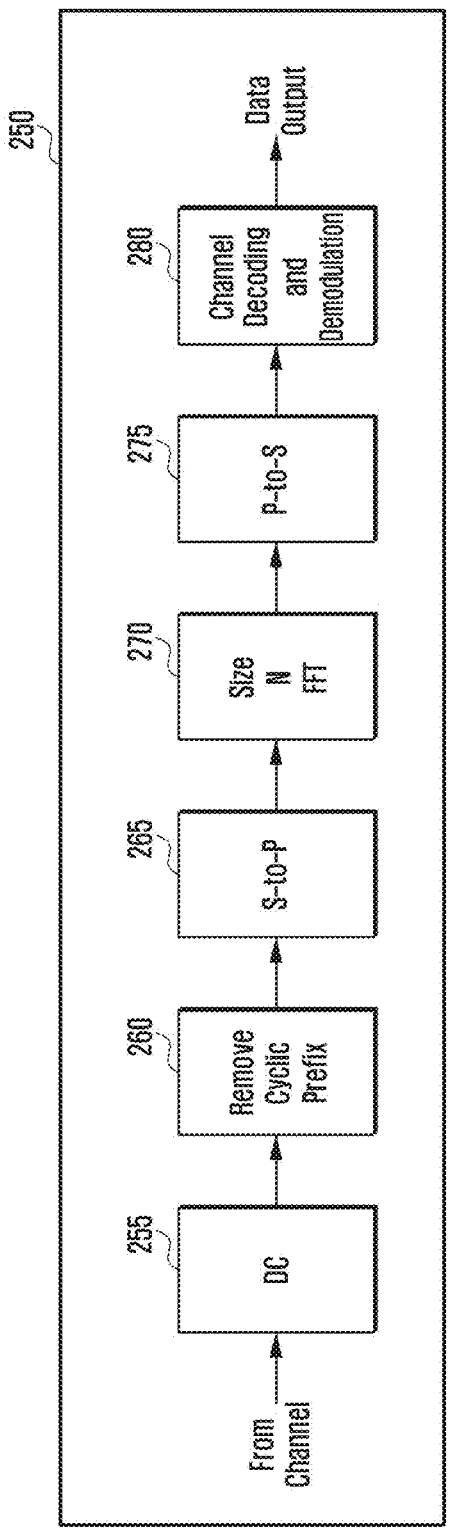
FIG. 2b illustrates an example wireless reception path according to the present disclosure.

FIGS. 2*a* and 2*b* show example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before conversion to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* show examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to show examples of types of transmission and reception paths that can be used in a wireless network. Any other suitable architecture can be used to support wireless communication in a wireless network.

FIG. 3*a* shows an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a shows an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a shows that the UE 116 is configured as a mobile phone or a smart phone, UEs can be configured to operate as other types of mobile or fixed devices.

FIG. 3b shows an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. GNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 6G or 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b shows an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Embodiment 1

Exemplary embodiments of the present disclosure are further described below with reference to the accompanying drawings. The following methods and apparatuses of the present disclosure can be implemented in a communication system supporting 6G or 5G or new radio access technologies or NR, LTE or LTE-A, etc.

The text and drawings are provided as examples only to help the readers understand the present disclosure. They do not intend to limit and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

At present, there are many self-interference cancellation methods, which are roughly divided into antenna cancellation methods, analog cancellation methods and digital cancellation methods. The antenna cancellation methods mainly refers to reducing the strength of self-interference signals reaching a receiving antenna by way of physically isolation and cancellation between a transmitted signal and a received signal and so on, by designing circuits of transmitting and receiving antennas. The analog cancellation methods mainly refers to the cancellation of self-interference signals in the analog domain of a receiving link (i.e., before analog-to-digital conversion). In a common self-interference cancellation structure, antenna cancellation and analog cancellation exist at the same time, which together make the signal input to the analog-to-digital converter be within a reasonable dynamic range. Considering implementation cost of antenna cancellation circuits and analog cancellation circuits, digital cancellation is usually adopted after analog cancellation in engineering implementation, to further process residual self-interference signals after analog cancellation.

As the name implies, the digital cancellation methods refers to the methods of canceling the self-interference signal in the digital domain of the receiver (i.e. after analog-to-digital conversion). Its basic principle is that a full duplex device transmits known modulation symbols or reference signals on specific physical resources and receives self-interference signals at the same time. According to the known transmitted modulation symbols or reference signals, the full duplex device can estimate the self-interference channel. On other physical resources, the full-duplex device receives and transmits at the same time, and a transmitted signal interferes with the receiving end through the self-interference channel. The full duplex device can reconstruct the self-interference signals on these physical resources based on the estimated self-interference channels, and delete the reconstructed self-interference signals from the received digital domain signals. Theoretically, the digital cancellation process can be realized in time domain or frequency domain, and the essential difference between the two methods is whether the self-interference channel estimation is carried out in time domain or frequency domain. However, considering that the digital cancellation process needs to deal with the nonlinear components of the self-interference signals, and that the frequency-domain digital cancellation needs more channel estimation pilot overhead when dealing with the nonlinear components of the self-interference signals, and cannot achieve performance consistent with that of the time-domain processing in case of same pilot overhead, therefore, from the perspective of self-interference cancellation performance, time-domain digital cancellation is a better choice.

When time-domain digital cancellation is considered, it is necessary to pay special attention to the non-ideal synchronization between the receiving and transmitting ends of a same device. Although the receiving and transmitting ends of the same device usually use the same clock with a common local crystal oscillator, due to the propagation delay of the line, the synchronization delay of the samples at the receiving and transmitting ends of the same device can reach an order of tens to hundreds of nanoseconds, and the synchronization delay is not necessarily an integral multiple of the sampling interval. In the traditional TDD or FDD systems, the physical resources for transmission and reception are orthogonal, and the non-ideal synchronization between the receiving and transmitting ends of a same device has no effect on the performance, so no attention is paid to the synchronization between the receiving and transmitting ends of the same device in the system design. However, for self-interference cancellation, even after the antenna cancellation and the analog cancellation, the self-interference signals to be processed by the digital cancellation is still about 50 dB higher than the useful signals. Even a slight synchronization delay between the receiving and transmitting ends may greatly affect the performance of self-interference cancellation. Taking the sampling rate of 122.88 MHz with a bandwidth of 100 MHz as an example, digital cancellation requires that the synchronization delay difference between the receiving and transmitting ends is less than 1/1000 of the sampling interval (about 8 picoseconds), otherwise it will bring at least 3 dB loss of self-interference cancellation performance.

Therefore, the invention can solve the problem of how to estimate the synchronization delay with ultra-high resolution in the digital domain.

The invention aims to design a method for estimating and compensating for the synchronization delay with ultra-high resolution in the digital domain, so as to realize high-precision synchronization between the receiving and transmitting ends of a same device. The receiving and transmitting ends of the device can be separate components or integrated together.

Hereinafter, the "synchronization delay" refers to the synchronization delay between a signal transmitted by a transmitting end of a device and a signal received by a receiving end of the device and corresponding to the transmitted signal.

Hereinafter, the "device" refers to any apparatus with wireless communication capability, such as, but not limited to, terminals and base stations. The device may also be implemented in software, hardware, firmware, or a combination thereof.

FIG. 4 illustrates a self-inference cancellation method 400 according to an embodiment of the present disclosure.

At step 410, the device determines a self-interference channel. The device can determine a time-domain self-interference channel or a frequency-domain self-interference channel.

At step 420, the device cancels a self-interference signal determined based on the determined self-interference channel from the received signal.

Steps 410 and 420 will be described in more detail with reference to FIGS. 5a-10.

FIG. 5a illustrates an example method of performing self-interference cancellation in the time domain according to an embodiment of the present disclosure.

Specifically, FIG. 5 describes a method of estimating and compensating for synchronization delay with ultra-high resolution in digital domain, which can be used for high-precision synchronization between the receiving and transmitting ends of a same device. The receiving and transmitting ends can be separate components or integrated in one component.

At step 510, the device determines the synchronization delay between the receiving and transmitting ends of the device.

The above synchronization delay can be divided into two parts: the first part is an integral multiple of the predetermined sampling interval of the device, and hereinafter, the first part is simply referred to as an integral multiple delay; the second part is fractional times of the predetermined sampling interval of the device, and hereinafter, the second part is simply referred to as fractional multiple delay. The predetermined sampling interval can be the baseband sampling interval, noted as $T_s$, which can be determined as follows, for example, assuming that a subcarrier spacing of the system is $\Delta f$ and a size of FFT is $N_{FFT}$, the baseband sampling interval is $$T_s = \frac{1}{\Delta f \cdot N_{FFT}}$$

in seconds.

The device determines (or estimates) the integral multiple delay by transmitting a pilot sequence and processing the pilot sequence and a received signal corresponding to the transmitted pilot sequence.

Existing techniques can be used to estimate the integral multiple delay, such as synchronization at the sampling interval level between receiving and transmitting ends of a same device based on a transmitted synchronization sequence or a random access pilot.

It is necessary to estimate and compensate for the integral multiple delay first before estimating the fractional multiple delay. The reason is that by compensating for the integral multiple delay, it can be ensured that the fractional multiple delay falls into a receiving window so as to ensure the performance of the fractional multiple delay estimation.

The device determines (or estimates) the fractional multiple delay by transmitting a base sequence and processing a plurality of time-domain synchronization sequences derived from the base sequence and a received signal corresponding to the transmitted base sequence. Among them, the estimation of the fractional multiple delay can be processed in the frequency domain or time domain, and the estimated fractional multiple synchronization delay $\Delta_s$ can be written as $$\Delta_s = \frac{n_e}{N_e} \cdot T_s,$$

where $T_s$ is the baseband sampling interval, $N_e$ is a positive integer and the value of $$\frac{1}{N_e}.$$

$T_s$ reflects the accuracy of the fractional multiple delay estimation; $n_e$ is an integer, $$\frac{n_e}{N_e} \cdot T_s$$

represents the estimated fractional multiple synchronization delay. The estimation method of the fractional multiple delay will be described in further detail below with reference to FIG. 6a-9, or the existing Multiple Signal Classification (MUSIC) technology and the like can be used to estimate the fractional multiple delay.

At step 520, the device determines the time-domain self-interference channel based on the estimated synchronization delay.

The device determines (or estimates) the time-domain self-interference channel by transmitting a reference signal and processing the reference signal and a received signal corresponding to the transmitted reference signal. Hereinafter, the signals transmitted by the device are collectively referred to as "locally transmitted signals", and may also be referred to as "transmitted signals". They may include one or more of pilot sequences, base sequences, and reference signals, and may also include data signals, control signals, and the like. The pilot sequences, the base sequences, and the reference signals may be the same as or different from each other.

Before estimating the time-domain self-interference channel, the reference signal or the received signal corresponding to the reference signal is compensated based on the determined synchronization delay.

Scenario 1: when the synchronization delay includes only the integral multiple delay and does not include the fractional multiple delay, the device can compensate for one of the reference signal or the received signal corresponding to the reference signal by using the following modes A1, A2 or A3.

Mode A1:

In the mode A1, the device compensates for the received signal corresponding to the locally transmitted signal (in this case, the received signal corresponding to the reference signal). The device changes the receiving window for the received signal according to the estimated integral multiple delay. For example, assuming that the estimated integral multiple delay is $\Delta_I$ (in seconds) and $\Delta_I/T_s$ is a positive integer, at this time, the length of the receiving window for the received signal remains unchanged and the starting point of the receiving window is shifted backward by $$\frac{\Delta_I}{T_s}$$

samples.

Mode A2:

In mode A2, the device compensates for the locally transmitted signal (which is the reference signal at this time). Specifically, the device performs time-domain cyclic shift of the reference signal according to the estimated integral multiple delay. For example, assuming that the estimated integral multiple delay is $\Delta_I$ (in seconds) and $$\frac{\Delta_I}{T_s}$$

is a positive integer, at this time, the last $$\frac{\Delta_I}{T_s}$$

samples of the time-domain symbols of the reference signal are shifted to the starting position of the time-domain symbols.

Mode A3:

In mode A3, the device compensates for the reference signal transmitted locally. Specifically, the device may perform frequency-domain phase compensation. For example, denoting the estimated integral multiple synchronization delay as $\Delta_s$, and the corresponding frequency-domain phase is calculated as $$\theta = 2\pi \frac{\Delta_s}{T_s} \cdot \frac{1}{N_{FFT}}.$$

Then, phase compensation is performed on the frequency-domain signal of the reference signal. It is assumed that the frequency-domain data of the reference signal on the k-th subcarrier is $S_k$, and the phase compensated frequency-domain data is $X_k = S_k \cdot \exp j\theta k$. Finally, inverse Fourier transform (IFFT) is performed on the phase compensated frequency-domain signal $\{X_k, k=0, 1, \ldots\}$ of the reference signal to obtain a phase compensated time-domain signal of the reference signal.

Scenario 2: when the synchronization delay includes only a fractional multiple delay, the device can compensate for one of the reference signal or the received signal corresponding to the reference signal by using the following modes B1, B2 or B3:

Mode B1:

In mode B1, the device compensates for the locally transmitted signal (which is the reference signal at this time). The mode B1 is the same as the aforementioned mode A3. Specifically, the device can perform frequency-domain phase compensation. For example, denoting the estimated fractional multiple synchronization delay as $\Delta_s$, and the corresponding frequency-domain phase is calculated as $$\theta = 2\pi \frac{\Delta_s}{T_s} \cdot \frac{1}{N_{FFT}}.$$

Then, phase compensation is performed on the frequency-domain signal of the reference signal. It is assumed that the frequency-domain data of the reference signal on the kth subcarrier is $S_k$, and the phase compensated frequency-domain data is $X_k = S_k \cdot \exp j\theta k$. Finally, inverse Fourier transform (IFFT) is performed on the phase compensated frequency-domain signal of the reference signal, $\{X_k, k=0, 1, \ldots\}$, to obtain a phase compensated time-domain signal of the reference signal.

This compensation method for fractional multiple delay can solve the compensation for synchronization delay of non-integral sampling intervals through time-frequency transformation, and it can also be applicable to the compensation for synchronization delay of integral sampling intervals, which has better application characteristics. The advantage of this design is that it has low implementation complexity when the requirement on the accuracy of fractional multiple delay estimation is low.

Mode B2:

In mode B2, the device compensates for the locally transmitted signal (which is the reference signal at this time).

Specifically, the device performs time-domain interpolation. Specifically, it is assumed that the expression of the time-domain signal of the reference signal is $x[n]$, $n=0, \ldots, N_{FFT}-1$, where $N_{FFT}$ is the size of the fast Fourier transform. Assuming that the continuous interpolation function is $f(t)$, and the estimated fractional multiple delay is denoted as $\Delta_s$, then the method for compensating the reference signal for the fractional multiple delay with time-domain interpolation method is as below:

$$x_i'[n] = \sum_{k=N_1}^{N_2} x[k] \cdot f\left(\left(N_e \cdot n + \frac{\Delta_s}{T_s} - k\right) \cdot T_s\right),$$

$n=0, \ldots, N_{FFT}-1$, where $N_e$ is a positive integer and $$\frac{1}{N_e} \cdot T_s$$

the accuracy of the fractional multiple delay estimation, $N_1$ and $N_2$ are the lower limit and upper limit for the summation in interpolation calculation, respectively, and the specific values of $N_1$ and $N_2$ can be selected according to the characteristics of interpolation function. Preferably, for the OFDM system, the interpolation function can be sinc function, that is $$f[n] = \frac{\sin(n)}{n}.$$

The advantage of this design is that it has low implementation complexity when the requirement on the accuracy of fractional multiple delay estimation is high.

Mode B3:

In the mode B3, the device compensates for the received signal corresponding to the locally transmitted signal (in this case, the received signal corresponding to the reference signal).

Specifically, the device performs time-domain interpolation. Specifically, it is assumed that the expression of the time-domain signal of the received signal is $x[n]$, $n=0, \ldots, N_{FFT}-1$, where $N_{FFT}$ is the size of the fast Fourier transform. Assuming that the continuous interpolation function is $f(t)$, and the estimated fractional multiple delay is denoted as $\Delta_s$, then the method for compensating the received signal for the fractional multiple synchronization delay with the time-domain interpolation method is as below:

$$x_i'[n] = \sum_{k=N_1}^{N_2} x[k] \cdot f\left(\left(N_e \cdot n + \frac{\Delta_s}{T_s} - k\right) \cdot T_s\right),$$

$n=0, \ldots N_{FFT}-1$, where $N_e$ is a positive integer $$\frac{1}{N_e} \cdot T_s$$

and the accuracy of the fractional multiple delay estimation, $N_1$ and $N_2$ are the lower limit and upper limit for the summation in interpolation calculation, respectively, and the specific values of $N_1$ and $N_2$ can be selected according to the characteristics of interpolation function. Preferably, for the OFDM system, the interpolation function can be sinc function, that is $$f[n] = \frac{\sin(n)}{n}.$$

The advantage of this design is that it has low implementation complexity when the requirement on the accuracy of fractional multiple delay estimation is high.

Scenario 3: when the synchronization delay includes not only the integral multiple delay but also the fractional multiple delay, the device can compensate for one of the reference signal or the received signal corresponding to the reference signal for the synchronization delay by using one of the following modes B1-B4.

Alternatively, the device may first compensate one of the reference signal or the received signal corresponding to the reference signal for the integral multiple delay by using one of the modes A1-A3; then, one of the modes B1-B3 is used to compensate one of the received signal corresponding to the reference signal after the integral multiple delay has been compensated and the reference signal for the fractional multiple delay, or one of the modes B1-B3 is used to compensate one of the reference signal after the integral multiple delay has been compensated and the received signal corresponding to the reference signal for the fractional multiple delay.

At step 530, the device cancels the self-interference based on the determined time-domain self-interference channel.

Preferably, the self-interference signal cancellation process can be completed in the time domain.

A specific implementation may be as below: it is assumed that the estimated time-domain self-interference channel, which is obtained by the time-domain channel estimation according to the reference signal compensated based on synchronization delay $\tilde{\Delta}_s$ and the received signal, is $\hat{h}[l]$, $l=0, 1, \ldots, L_{tap}$, where $L_{tap}$ represents a number of resolvable multi-paths. Then, the self-interference signal on the time-domain symbols (e.g., OFDM symbols) of the reference signal of the non-transmitted self-interference channel can be reconstructed and cancelled. Firstly, the reference signal is compensated for synchronization delay $\tilde{\Delta}_s$, and the reference signal compensated for synchronization delay is d'[n], $n=0, 1, \ldots, N_{FFT}-1$, then the reconstructed self-interference signal is $d'[n] * \hat{h}[l]$ (the cyclic prefix is intercepted, and $N_{FFT}$ data symbols remain), and the process of self-interference signal cancellation can be written as $y[n]-d'[n]*\hat{h}[l]$, $n=0, 1, \ldots, N_{FFT}-1$, where y[n] indicates the signal received by the device, which contains the self-interference signal, and can also contain signals expected to be received from other devices.

Alternatively, another specific implementation may be as follows: it is assumed that the estimated time-domain self-interference channel, which is obtained by the time-domain channel estimation according to the received signal compensated based on synchronous delay $\tilde{\Delta}_s$ and the reference signal, is $\hat{h}[l]$, $l=0, 1, \ldots, L_{tap}$, where $L_{tap}$ represents a number of resolvable multi-paths. Then, the self-interference signal on the OFDM symbols of the non-transmitted self-interference channel can be reconstructed and canceled. Denoting the reference signal as d[n], $n=0, 1, \ldots, N_{FFT}-1$ (not compensated for synchronization delay), then the reconstructed self-interference signal is $d[n]*\hat{h}[l]$ (the cyclic prefix is intercepted, and $N_{FFT}$ data symbols remain), and the process of self-interference signal cancellation can be written as $y[n]-d[n]*\hat{h}[l]$, $n=0, 1, \ldots, N_{FFT}-1$, where y[n] indicates the signal received by the device, which contains the self-interference signal, and can also contain signals expected to be received from other devices.

FIG. 5b illustrates an example method for estimating the fractional multiple delay according to the present disclosure.

At step 501, the device compensates for the integral multiple delay.

As mentioned above, before estimating the fractional multiple delay, if the integral multiple delay is not 0, the integral multiple delay should be estimated and compensated for first. The reason is that by compensating for the integral multiple delay, it can be ensured that the fractional multiple delay falls into the receiving window so as to ensure the performance of the fractional multiple delay estimation. Specifically, the device should first compensate the base sequence or the received signal corresponding to the base sequence for the integral multiple delay. For example, the device can adopt one of the aforementioned modes A1-A3. For example, if the device compensates the base sequence for the integral multiple delay, the compensation mode of the device can be as follows: assuming that the estimated integral multiple delay is $\Delta_I$ (in seconds) and $$\frac{\Delta_I}{T_s}$$

is a positive integer, and then the device will shift the last $$\frac{\Delta_I}{T_s}$$

samples of the base sequence to the starting position of the base sequence.

At step 502, the device estimates the fractional multiple delay.

Hereinafter, the method for estimating the fractional multiple delay will be described in detail with specific reference to FIGS. 6a-9.

FIG. 6a illustrates an example method for estimating the fractional multiple delay according to the present disclosure.

The device determines (or estimates) the fractional multiple delay by transmitting the base sequence and processing a plurality of time-domain synchronization sequences derived from the base sequence and the received signal corresponding to the transmitted base sequence.

At step 600, the device compensates for the integral multiple delay. As mentioned above, before estimating the fractional multiple delay, if the integral multiple delay is not 0, the integral multiple delay should be estimated and compensated for first. The reason is that by compensating for the integral multiple delay, it can be ensured that the fractional multiple delay falls into the receiving window so as to ensure the performance of the fractional multiple delay estimation. Specifically, the device should first compensate the base sequence or the received signal corresponding to the base sequence for the integral multiple delay. For example, the device can adopt one of the aforementioned modes A1-A3. For example, if the device compensates the base sequence for the integral multiple delay, the compensation mode of the device can be as follows: assuming that the estimated integral multiple delay is $\Delta_I$ (in seconds) and $$\frac{\Delta_I}{T_s}$$

is a positive integer, and then the device will shift the last $$\frac{\Delta_I}{T_s}$$

samples of the base sequence to the starting position of the base sequence. However, the method by which the device compensates the base sequence for the integral multiple delay is not limited to this.

At step 610, the device generates a time-domain synchronization sequence group.

The device generates a time-domain synchronization sequence group containing $N_e$ time-domain synchronization sequences. Preferably, $N_e > 1$ time-domain synchronization sequences are generated to improve the accuracy of synchronization delay estimation, where multiple time-domain synchronization sequences have the following characteristics: based on the target accuracy of synchronization delay estimation, $$\frac{1}{N_e} \cdot T_s,$$

the number of time-domain synchronization sequences $N_e$ is determined, and any time-domain synchronization sequence in the time-domain synchronization sequence group correspond to distinctive synchronization delay with the same accuracy, for example, the $i^{th}$, $i \in [0, N_e-1]$, time-domain synchronization sequence in the time-domain synchronization sequence group is a time-domain synchronization sequence corresponding to synchronization delay $$\bar{\Delta}_i = \frac{i - \left\lfloor \frac{N_e}{2} \right\rfloor}{N_e} \cdot T_s$$

(or synchronization delay $$\bar{\Delta}_i = \frac{i - \left\lceil \frac{N_e}{2} \right\rceil}{N_e} \cdot T_s).$$

There are four modes for generating time-domain synchronization sequences (C1, C2, C3):

Mode C1:

In the mode C1, the device obtains time-domain synchronization sequences corresponding to different synchronization delay amounts by time-domain interpolation on a first base sequence (if the base sequence is not compensated before step 610, the first base sequence is as same as the base sequence; if the base sequence is compensated before step 610, the first base sequence is as same as the compensated base sequence). A specific way can be calculating each element in the corresponding time-domain synchronization sequence, respectively, by using an interpolation function based on the synchronization delay amount. For example, if the first base sequence is a time-domain sequence $x[n]$, $n=0, \ldots, N_{seq}-1$ with a length of $N_{seq}$ and the continuous interpolation function is assumed to be $f(t)$, then the method for obtaining the time-domain synchronization sequence $\{x_i'[n], n=0, \ldots, N_{seq}-1\}$ with index i corresponding to synchronization delay $$\bar{\Delta}_i = \frac{i - \left\lfloor \frac{N_e}{2} \right\rfloor}{N_e} \cdot T_s ( \text{ or } \bar{\Delta}_i = \frac{i - \left\lceil \frac{N_e}{2} \right\rceil}{N_e} \cdot T_s)$$

by interpolation is as follows:

$$x_i'[n] = \sum_{k=N_1}^{N_2} x[k] \cdot f\left(\left(N_e \cdot n + \frac{\bar{\Delta}_i}{T_s} - k\right) \cdot T_s\right),$$

$n=0, \ldots, N_{seq}-1$, where $N_1$ and $N_2$ are the lower limit and upper limit for summation in interpolation calculation, respectively, and the specific values of $N_1$ and $N_2$ can be selected according to the characteristics of interpolation function.

The device generates the first base sequence in the following ways:

The device can concatenate a plurality of time-domain sequences to form an ultra-long first base sequence, in which any two time-domain sequences are the same or at least two time-domain sequences are different. The advantage of this way is that the ultra-long first base sequence has better auto-correlation and cross-correlation characteristics, which is helpful to improve the performance of synchronization delay estimation. Preferably, any two time-domain sequences in the plurality of time-domain sequences constituting the ultra-long base sequence are orthogonal. This design can further improve the auto-correlation and cross-correlation characteristics of synchronization sequences. Specifically, the method for generating a plurality of mutually orthogonal time-domain sequences for forming an ultra-long first base sequence can be as follows: firstly, generating M frequency-domain ZC sequences with a length of $L_{seq}$, where the M sequences are of a same root sequence and different cyclic shifts and are orthogonal to each other; then, transforming these M sequences into time domain through IFFT to obtain M time-domain sequences with a length of $N_{FFT}$, and concatenating these M time-domain sequences, the length of the obtained ultra-long first base sequence for time-domain synchronization is $N_{seq} = M \cdot N_{FFT}$. The advantage of this method is that a plurality of sequences orthogonal in time-domain are constructed by using the characteristics of orthogonality in both time and frequency domains of the ZC sequences.

Alternatively, the device may construct the first base sequence by selecting and concatenating time-domain transmitted signals of several consecutive time-domain symbols (e.g., OFDM symbols), where the time-domain transmitted signals may be any physical channel or physical signal with constant transmit power within the duration of the several time-domain symbols (e.g., OFDM symbols). The advantage of this design is that the transmission design of existing systems can be reused.

Mode C2:

In mode C2, the device uses an interpolation function to spread the first base sequence into a longer interpolation-spread sequence, performs extraction on the interpolation-spread sequence to extract time-domain synchronization sequences corresponding to different synchronization delay amounts in turn. For example, if the first base sequence is a time-domain sequence $x[n]$, $n=0, \ldots, N_{seq}-1$ with a length of $N_{seq}$ and the continuous interpolation function is $f(t)$, then the way for obtaining the interpolation-spread sequence by way of interpolation can be $$x'[N_e \cdot n + i] = \sum_{k=N_1}^{N_2} x[k] \cdot f\left(\left(N_e \cdot n + \frac{i - \left\lfloor \frac{N_e}{2} \right\rfloor}{N_e} - k\right) \cdot T_s\right),$$

n=0, ..., $N_{seq}-1$, i=0, ..., $N_e-1$, which can also expressed as $$x'[N_e \cdot n + i] = \sum_{k=N_1}^{N_2} x[k] \cdot f\left(\left(N_e \cdot n + \frac{i - \left\lfloor\frac{N_e}{2}\right\rfloor}{N_e} - k\right) \cdot T_s\right),$$

n=0, ..., $N_{seq}-1$, i=0, ..., $N_e-1$. Then the time-domain synchronization sequence {$x_i'[n]$, n=0, ..., $k_{seq}-1$} with the index i corresponding to the synchronization delay amount $$\bar{\Delta}_i = \frac{i - \left\lfloor\frac{N_e}{2}\right\rfloor}{N_e} \cdot T_s \left(\text{or } \bar{\Delta}_i = \frac{i - \left\lceil\frac{N_e}{2}\right\rceil}{N_e} \cdot T_s\right)$$

is a sequence obtained by extracting from the interpolation-spread sequence {x'[n], n=0, ..., $N_{seq}N_e-1$} with a starting position i and an interval $N_e$. Preferably, for the OFDM system, the interpolation function can be sinc function, that is $$f[n] = \frac{\sin(n)}{n}.$$

The method can generate synchronization sequences of ultra-high resolution that is much higher than the baseband sampling interval by way of time-domain interpolation, and improve the accuracy of synchronization delay estimation.

Mode C3:

In mode C3, the device can generate a time-domain synchronization sequence group containing $N_e$ time-domain synchronization sequences by adopting a way of adding frequency-domain linear phases. Specifically, based on the first base sequence, a frequency-domain synchronization sequence group is generated in the frequency domain, and for each frequency-domain synchronization sequence in the frequency-domain synchronization sequence group, a corresponding linear phase is added according to its corresponding synchronization delay. Specifically, for the time-domain synchronization sequence group containing $N_e$ time-domain synchronization sequences as described above, if the synchronization delay step corresponding to each time-domain synchronization sequence is $$\frac{1}{N_e}T_s,$$

then the synchronization delay corresponding to the n-th sequence is $$\frac{n - \left\lfloor\frac{N_e}{2}\right\rfloor}{N_e}T_s \text{ or } \frac{n - \left\lceil\frac{Ne}{2}\right\rceil}{N_e}T_s,$$

so the linear phase required to generate the frequency-domain synchronization sequence corresponding to the time-domain synchronization sequence is $$\theta = \frac{2\pi}{N_{FFT}} \cdot \frac{n - \left\lfloor\frac{N_e}{2}\right\rfloor}{N_e} \text{ or } \theta = \frac{2\pi}{N_{FFT}} \cdot \frac{n - \left\lceil\frac{N_e}{2}\right\rceil}{N_e}.$$

For element $S_k$ of the frequency-domain synchronization sequence on the $k^{th}$ subcarrier, the element having been added the linear phase is expressed as $\bar{S}_k = S_k \exp jk\theta$. After adding a linear phase to each element, IFFT transform is performed on the frequency-domain synchronization sequence having been added the linear phase, and then the time-domain synchronization sequence can be obtained.

Optionally, after generating a time-domain synchronization sequence group containing $N_e$ time-domain synchronization sequences by one of the above three modes C1-C3, the device may perform an operation of storing the time-domain synchronization sequence group. The advantage of this operation is that there is no need to generate the $N_e$ time-domain sequences in real time by pre-storing the time-domain synchronization sequence group that does not change with the real-time synchronization delay, which can reduce the implementation complexity.

At step 620, the device performs time-domain correlation between the time-domain synchronization sequence group and the received signal to estimate the fractional multiple delay.

Specifically, the device may correlate the received signal (if the device did not compensate the base sequence for the integral multiple delay before step 610, then here the received signal is the received signal compensated for the integral multiple delay) with the time-domain synchronization sequences in the time-domain synchronization sequence group in turn, and determine the estimated synchronization delay according to the correlation peak. For example, the device first determines the position of a time-domain detection window (for example, an OFDM detection window) according to the integral multiple delay, and intercepts received signal samples of the same length as the first base sequence, which is denoted as $N_{seq}$; the received signal samples with the length of $N_{seq}$ are correlated with the $N_e$ time-domain synchronization sequences in the afore-mentioned generated time-domain synchronization sequence group, respectively. If the index of the time-domain synchronization sequence with the largest correlation value is i and the corresponding synchronization delay is $$\bar{\Delta}_i = \frac{i - \left\lfloor\frac{N_e}{2}\right\rfloor}{N_e} \cdot T_s \left(\text{or } \bar{\Delta}_i = \frac{i - \left\lceil\frac{N_e}{2}\right\rceil}{N_e} \cdot T_s\right).$$

then the estimated fractional multiple delay is $$\bar{\Delta}_i = \frac{i - \left\lfloor\frac{N_e}{2}\right\rfloor}{N_e} \cdot T_s \left(\text{or } \bar{\Delta}_i = \frac{i - \left\lceil\frac{N_e}{2}\right\rceil}{N_e} \cdot T_s\right).$$

Furthermore, according to the auto-correlation and cross-correlation characteristics of the time-domain synchronization sequences in the time-domain synchronization sequence group, the synchronization delay obtained from the correspondence between the correlation peak and the time-domain synchronization sequences can be further adjusted. For example, if the synchronization delay corresponding to the time-domain synchronization sequence with the largest correlation value is $$\tilde{\Delta}_i = \frac{i - \left\lfloor \frac{N_e}{2} \right\rfloor}{N_e} \cdot T_s \left( \text{ or } \tilde{\Delta}_i = \frac{i - \left\lceil \frac{N_e}{2} \right\rceil}{N_e} \cdot T_s \right),$$

the synchronization delay adjustment factor can be set according to the characteristics of the time-domain synchronization sequences, as ε, and then the estimated fractional multiple delay is obtained as $$\frac{i - \left\lceil \frac{N_e}{2} \right\rceil - \varepsilon}{N_e} \cdot T_s.$$

The advantage of this design is that the estimated synchronization delay can be further modified according to the characteristics of the time-domain synchronization sequences, and the performance of synchronization delay estimation can be improved.

The method described above in connection with FIG. 6a is characterized in low complexity.

FIG. 6b shows a block diagram of the implementation of the method for estimating the fractional multiple delay shown in FIG. 6a.

FIG. 7 illustrates another example method for estimating fractional multiple delay according to an embodiment of the present disclosure.

As described above, the device determines (or estimates) the fractional delay by transmitting the base sequence and processing a plurality of time-domain synchronization sequences derived from the base sequence and the received signal corresponding to the transmitted base sequence.

At step 700, the device compensates for the integral multiple delay. As mentioned above, before estimating the fractional multiple delay, if the integral multiple delay is not 0, the integral multiple delay should be estimated and compensated for first. The reason is that by compensating for the integral multiple delay, it can be ensured that the fractional multiple delay falls into the receiving window so as to ensure the performance of the fractional multiple delay estimation. Specifically, the device should first compensate the base sequence or the received signal corresponding to the base sequence for the integral multiple delay. For example, the device can adopt one of the aforementioned modes A1-A3. For example, if the device compensates the base sequence for the integral multiple delay, the compensation mode of the device can be as follows: assuming that the estimated integral multiple delay is $\Delta_I$ (in seconds) and $$\frac{\Delta_I}{T_s}$$

is a positive integer, and then the device will shift the last $$\frac{\Delta_I}{T_s}$$

samples of the base sequence to the starting position of the base sequence.

At step 710, the device generates a time-domain synchronization sequence group. The operation of step 710 is similar to that of step 610, and will not be repeatedly described here.

At step 720, the device determines residual self-interference caused by the fractional multiple delay corresponding to each time-domain synchronization sequence.

Specifically, the device generates a matrix for channel estimation corresponding to each time-domain synchronization sequence after obtaining a time-domain synchronization sequence group containing $N_e$ time-domain synchronization sequences. Specifically, assuming that the n-th time-domain synchronization sequence of the channel to be estimated is $x_n$, firstly, the Toplitz matrix $X_n$ corresponding to the sequence $x_n$ is generated, as shown below:

$$X_n = \begin{bmatrix} x_n(0) & x_n(N-1) & \ldots & x_n(N-L+1) \\ x_n(1) & x_n(0) & \ldots & x_n(N-L) \\ \ldots & \ldots & \ldots & \ldots \\ x_n(N-1) & x_n(N-2) & \ldots & x_n(N-L) \end{bmatrix}$$

where, n is the size of time-domain symbols, which is generally the size of FFT, and $x_n(m)$ is the m-th element of the sequence $x_n$.

Calculating the matrix $W_n$ for channel estimation according to $X_n$, as follows:

$$W_n = (X_n^H X_n)^{-1} X_n^H$$

Using the above formula to calculate the corresponding matrix $W_n$ for channel estimation for each time-domain synchronization sequence in the time-domain synchronization sequence group.

In actual use, the afore-mentioned matrix $W_n$ for channel estimation can be stored together with the corresponding time-domain synchronization sequence group, or can be calculated in real time according to the time-domain synchronization sequence group.

Unlike the method described in connection with FIG. 6a, in the method described in connection with FIG. 7, a single OFDM symbol can be used as a time-domain synchronization sequence without using concatenation of a plurality of short sequences.

After receiving the self-interference signal from the transmitting end of the device, the receiving end of the device compensates the received self-interference signal for the integral multiple delay if it is determined that the device has not compensated the base sequence for the integral multiple delay, then the receiving end of the device determines the position of the time-domain receiving window (for example, OFDM receiving window) according to the integral multiple delay, and intercepts a signal y.

The device performs time-domain self-interference cancellation on the intercepted signal according to the intercepted signal y, the time-domain synchronization sequence group and the channel estimation matrix $W_n$, and obtains the residual self-interference corresponding to each synchronization delay. Specifically, for the time-domain synchronization sequence n in the time-domain synchronization sequence group, the time-domain self-interference channel is estimated by using its corresponding matrix $W_n$ for channel estimation, i.e $\hat{h}_n = W_n y$. The estimated time-domain self-interference channel $\hat{h}_n$ and the time-domain synchronization sequence n are used to reconstruct a self-interference signal, that is $x_n^{SI} = \hat{h}_n \otimes x_n$, then the residual self-interference is $RSI_n = |y - x_n^{SI}|$, where |•| represents a modulo operation.

At step 730, the device determines the fractional multiple delay according to the residual self-interference.

After the self-interference cancellation for all time-domain synchronization sequences in the time-domain synchronization sequence group is completed, the power of the residual self-interference obtained for each time-domain synchronization sequence is compared, and the synchronization delay corresponding to the time-domain synchronization sequence with the smallest residual self-interference is selected as the fractional multiple delay.

FIG. 8a illustrates another example method for estimating the fractional multiple delay according to an embodiment of the present disclosure.

The method described in connection with FIG. 8a adopts hierarchical synchronization combining coarse synchronization with fine synchronization to estimate the fractional multiple delay, which can greatly reduce the complexity of the fractional multiple delay estimation. Among them, the coarse synchronization process can roughly estimate and compensate for the fractional multiple delay, so as to reduce the processing complexity of the fine synchronization process for the fractional multiple delay. Since the complexity bottleneck of the synchronization delay estimation algorithm lies in the complexity of fine synchronization process for the fractional multiple delay, this hierarchical synchronization design can further reduce the overall complexity of the fractional multiple delay estimation.

As described above, the device determines (or estimates) the fractional delay by transmitting the base sequence and processing a plurality of time-domain synchronization sequences derived from the base sequence and the received signal corresponding to the transmitted base sequence.

At step 800, the device compensates for the integral multiple delay. As mentioned above, before estimating the fractional multiple delay, if the integral multiple delay is not 0, the integral multiple delay should be estimated and compensated for first. The reason is that by compensating for the integral multiple delay, it can be ensured that the fractional multiple delay falls into the receiving window so as to ensure the performance of the fractional multiple delay estimation. Specifically, the device should first compensate the base sequence or the received signal corresponding to the base sequence for the integral multiple delay. For example, the device can adopt one of the aforementioned modes A1-A3. For example, if the device compensates the base sequence for the integral multiple delay, the compensation mode of the device can be as follows: assuming that the estimated integral multiple delay is $\Delta_I$ (in seconds) and $$\frac{\Delta_I}{T_s}$$

is a positive integer, and then the device will shift the last $$\frac{\Delta_I}{T_s}$$

samples of the base sequence to the starting position of the base sequence.

Next, it will be described with reference to FIG. 8a.

At step 810, the device generates a time-domain synchronization sequence group. The operation of step 810 is similar to that of step 610, and will not be repeatedly described here.

At step 820, the device performs a coarse synchronization process and performs compensation according to the coarse synchronization result.

Specifically, the coarse synchronization process may be to estimate and compensate for the coarse-grained delay part in the fractional multiple delay. More specifically, the selected accuracy for estimation and compensation for the coarse-grained delay part performed by the coarse synchronization is not higher than the sampling interval corresponding to an oversampling rate of an oversampling operation performed on the transmitted base sequence or the received signal, where the oversampling operation can be implemented by an Analog to Digital Converter (ADC) or by time-domain interpolation in baseband.

The coarse synchronization process will be described in detail by taking the oversampling operation performed by ADC as an example. For example, if the oversampling rate of ADC is R, then a sampling interval corresponding to oversampling is $T_s/R$, where $T_s$ is the baseband sampling interval. The coarse synchronization process may be, determining, based on the oversampled sample data, the position of coarse synchronization or the coarse-grained delay part by the way of down extraction-correlation. Specifically, the device oversamples the received signal (if the base sequence is not compensated for the integral multiple delay at the generating device, then here the received signal is the received signal compensated for the integral multiple delay). For example, the oversampled data of $R \cdot N_{FFT}$ samples of an OFDM symbol is obtained, and it is down-extracted with different starting positions and a same sampling interval R to obtain R groups of sample sequences with a length of $N_{FFT}$, for example, the first group of sequences takes $N_{FFT}$ samples at an interval of R samples with an initial index 0; the n-th sequence takes $N_{FFT}$ samples at an interval of R samples with an initial index n−1. For the R groups of sequences, they are correlated with the time-domain synchronization sequences generated in step 810, and the coarse synchronization position or coarse-grained delay part is obtained according to the sequence index corresponding to the correlation peak. For example, if the correlation peak index appears in the correlation of the n-th sequence, then the coarse synchronization position is (n−1)/R, and the coarse-grained delay part is $$\frac{n-1}{R} \cdot T_s.$$

Then down-extraction of the oversampled data is performed on the transmitted data at an interval of R samples with an initial index n−1. When the oversampling rate is set to R=1, the above process can be used to estimate and compensate for the integral multiple delay.

The way in which the device performs compensation according to the coarse synchronization result can be one of the following modes 1 and 2:

Mode 1: The device selects a time-domain synchronization sequence for fine synchronization according to the oversampling rate R and the coarse synchronization position, and does not perform additional processing on the received signal (if the device did not compensate the base sequence for the integral multiple delay before step 810, here the received signal is the received signal compensated for the integral multiple delay). Specifically, according to the coarse synchronization position, the device selects a time-domain synchronization sequence subgroup for fine synchronization from R time-domain synchronization sequence subgroups obtained by dividing the time-domain synchronization sequence group according to the oversampling rate R. For example, it is assumed that the number of time-domain synchronization sequences contained in the time-domain synchronization sequence group generated in step 810 is $N_e$, where $N_e$ can be determined by the target accuracy of synchronization delay estimation, for example, if the target accuracy of synchronization delay estimation is $$\frac{T_s}{500},$$

$N_e$=500 can be selected. According to the oversampling rate of R, the device further divides the $N_e$ time-domain synchronization sequences in the time-domain synchronization sequence group into R subgroups, in which the synchronization delay respectively corresponding to the $M_n$ synchronization sequences contained in the subgroup with index n∈[0, R−1] is $$\left(n/R + \left(i_n - \left[\frac{M_n}{2}\right]\right)\bigg/N_e\right) \cdot T_s,$$

where $i_n$=0, . . . , $M_n$−1 is the synchronization sequence number in the subgroup, and $M_n$=min($\lceil N_e/R \rceil$, $N_e - \Sigma_{k=0}^{n-1} M_j$). Then, the time-domain synchronization sequence subgroup for fine synchronization is determined based on the coarse synchronization position. For example, if the coarse synchronization position is $$\frac{n}{R} \cdot T_s,$$

the index of me synchronization sequence subgroup selected for fine synchronization is n.

Mode 2: the device selects the time-domain synchronization sequence for fine synchronization according to the oversampling rate R, and performs compensation for coarse-grained delay part $$\frac{n-1}{R} \cdot T_s$$

of me received signal (it me device did not compensate the base sequence for the integral multiple delay before step 810, here the received signal is the received signal compensated for the integral multiple delay). Specifically, the device selects a first subgroup with leading indexes as a time-domain synchronization sequence subgroup for fine synchronization from R time-domain synchronization sequence subgroups obtained by dividing the time-domain synchronization sequence group according to the oversampling rate R. For example, it is assumed that the number of time-domain synchronization sequences contained in the time-domain synchronization sequence group generated in step 810 is $N_e$, where $N_e$ is determined by the target accuracy of synchronization delay estimation, for example, if the target accuracy of synchronization delay estimation is $$\frac{T_s}{500},$$

it can be selected that $N_e$=500 can be selected. In view of this, the device selects the first $\lceil N_e/R \rceil$ consecutive time-domain synchronization sequences with the leading indexes among the $N_e$ time-domain synchronization sequences in the time-domain synchronization sequence group, for fine synchronization. Alternatively, according to the method for generating the time-domain synchronization sequence in step 810, the device generates the first $\lceil N_e/R \rceil$ continuous time-domain synchronization sequences with the leading indexes, for fine synchronization.

At step 830, the device performs the fine synchronization process.

In case that the device performs compensation in mode 1, the process of fine synchronization by the device is as follows: determining the fine-grained delay part according to a plurality of time-domain synchronization sequences selected for fine synchronization based on the coarse synchronization position and the received signal (if the device did not compensate the base sequence for the integral multiple delay before step 810, here the received signal is the received signal compensated for the integral multiple delay). The method described in FIG. 6a or FIG. 7 can be used to determine the fine-grained delay part, which is not repeatedly described here. For example, the device uses the $M_n$ time-domain synchronization sequences in the time-domain synchronization sequence subgroup with index n to respectively perform correlation calculation with the received signal (if the device did not compensate the base sequence for the integral multiple delay before step 810, here the received signal is the received signal compensated for the integral multiple delay), and selects the peak value from the correlation values. Assuming that the index of the time-domain synchronization sequence in the time-domain synchronization sequence subgroup with index n corresponding to the peak value is Ĩ, then the estimated value of the fractional multiple delay obtained by coarse synchronization and fine synchronization is $$\left(n/R + \left(\tilde{I} - \left[\frac{M_n}{2}\right]\right)\bigg/N_e\right) \cdot T_s.$$

Figure 8B:
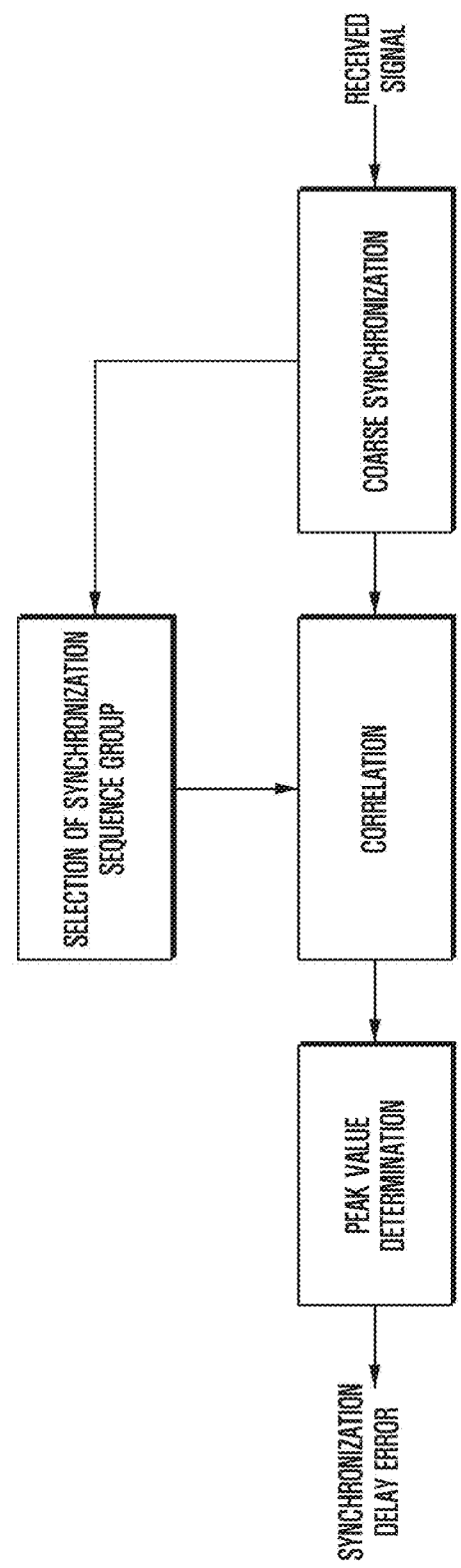
Figure 8C:
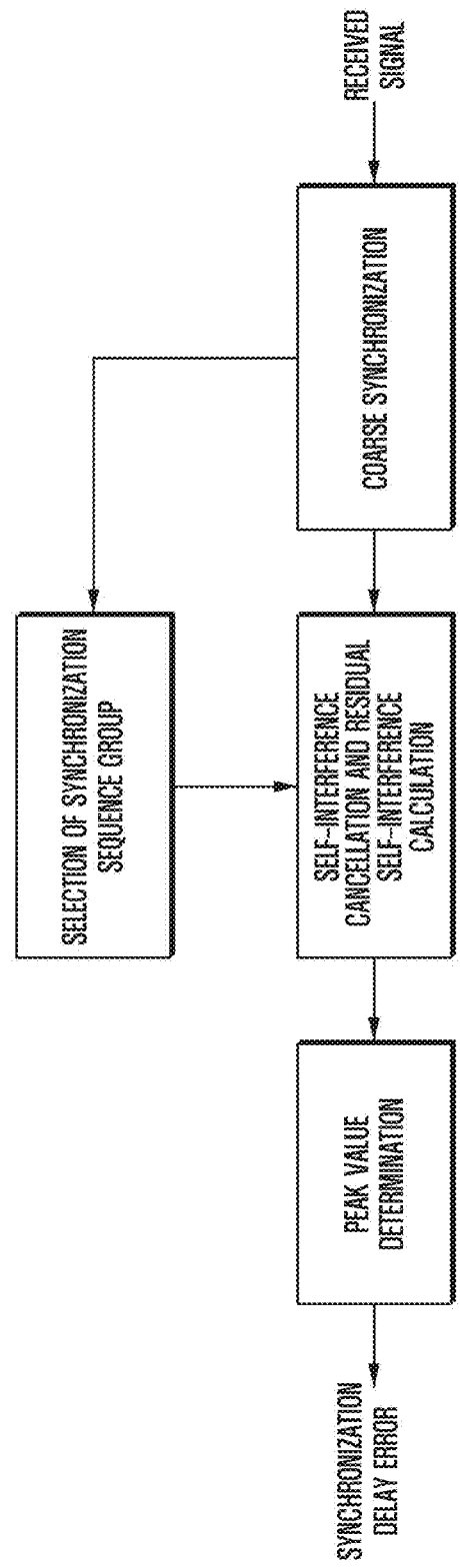

Alternatively, when the device performs compensation in the mode 2, the process of performing fine synchronization by the device is as follows: determining the fine-grained delay part according to a plurality of time-domain synchronization sequences selected for fine synchronization and the received signal that has been compensated for the coarse-grained delay part (if the device did not compensate the base sequence for the integral multiple delay before step 810, here the received signal that has been compensated for the coarse-grained delay part is the received signal compensated for the integral multiple delay). The method described in FIG. 6a or FIG. 7 can be used to determine the fine-grained delay part, which is not repeatedly described here. FIGS. 8b and 8c illustrate the implementation block diagram of the method for estimating the fractional multiple delay illustrated in FIG. 8a.

The advantage of the hierarchical design described in connection with FIG. 8a is that the number of correlation operations between the time-domain synchronization sequences and the receiving sequence can be effectively reduced, thus greatly reducing the implementation complexity. The advantage of this design is also in that, for the fine synchronization process, only $\lceil N_e/R \rceil$ synchronization sequences, instead of $N_e$ synchronization sequences, need to be stored, which reduces the requirements for the storage capacity of the device.

The followings give an instance of implementation for the fine synchronization. For an OFDM system with a system bandwidth of 100 MHz, if the subcarrier spacing is 120 kHz and the size of Fourier transform $N_{FFT}$ is 1024, then the sampling rate is 122.88 MHz and the sampling interval $T_s$ is about 8 nanoseconds. In this situation, in order to ensure the performance of time-domain self-interference cancellation, the accuracy of synchronization delay estimation for the transmitting end and the receiving end is required to be $$\frac{T_s}{500} \approx 16$$

picoseconds. 12 LC sequences with a length of 839 are concatenated to form a base sequence of ultra-long time-domain synchronization sequences, where the 12 ZC sequences are of the same root sequence and different cyclic shifts, and the difference between the cyclic shifts of adjacent ZC sequences is 10. One can refer to the generation of random access preamble sequences in existing NR for the specific ZC sequence generation method; the method of constructing the ultra-long synchronization sequences by concatenation can be seen in the related description in step 610 of FIG. 6a, thus the base sequence of the ultra-long time-domain synchronization sequences is obtained, which is of the length of $12N_{FFT}=12288$. Then, according to the method in step 610 of FIG. 6a, time-domain synchronization sequences corresponding to different synchronization delays are obtained by time-domain interpolation performed on the base sequence of time-domain synchronization sequences, and the number of the obtained time-domain synchronization sequences can be determined by the target accuracy of synchronization delay estimation as 500, and the lengths of the time-domain synchronization sequences are all 12288. Assuming that the analog-to-digital conversion can support over-sampling of 20 times, the coarse synchronization process can realize estimation of an accuracy of $$\frac{T_s}{20} \approx 400$$

picoseconds of the coarse-grained delay part. The specific method can be as described in the above coarse synchronization process, and the coarse synchronization position can be obtained through 20 correlation calculations. At this time, 500 time-domain synchronization sequences are further grouped, which can be divided into 20 time-domain synchronization sequence subgroups, each subgroup contains 25 time-domain synchronization sequences with a length of 12288. Then, according to the coarse synchronization position, the time-domain synchronization sequence subgroup used for fine synchronization process is determined, and 25 sequences in the time-domain synchronization sequence subgroup are used to correlate with the received signal to determine the fine synchronization position. The specific method can be as described in the above-mentioned fine synchronization process. It can be seen that the calculation complexity of synchronization delay estimation can be greatly reduced by the two-stage synchronization, and the number of correlation calculations can be reduced from 500 to 45 (including 20 correlation calculations for coarse synchronization and 25 correlation calculations for fine synchronization).

As mentioned above, the methods illustrated in FIGS. 6 and 7 can be combined when performing the fine synchronization process after completing the coarse synchronization process for the fractional multiple delay. Specifically, based on the received signals and a plurality of time-domain synchronization sequences for fine synchronization selected according to the coarse synchronization position, or based on the first $\lceil N_e/R \rceil$ with leading indexes of a plurality of time-domain synchronization sequences for fine synchronization in time domain, and the received signals compensated based on the coarse synchronization result, the fine synchronization position is first determined by way of correlation, for example, the sequence index corresponding to the correlation peak is known as n by way of correlation; after that, the fine synchronization process based on residual self-interference is carried out by using $N_{SIC}$ sequences near sequence n in the same time-domain synchronization sequence group. Specifically, after the sequence n with the highest correlation peak is obtained by way of correlation, the sequence with index $$\left[\max\left(N_1, n - \left\lceil \frac{N_{SIC}}{2} \right\rceil\right), \min\left(N_2, n + \left\lfloor \frac{N_{SIC}}{2} \right\rfloor\right)\right]$$

is selected for self-interference cancellation, and the residual self-interference power corresponding to each sequence is obtained, from which the sequence with the smallest residual self-interference power is selected, and the fine-grained delay part of the fractional multiple delay is determined according to the index of the selected sequence. Where $N_1$ is the minimum index of the selected sequence group and $N_2$ the maximum index of the selected sequence group.

The synchronization delay estimation method provided by the invention can be carried out periodically. For example, a period P is configured, that is, the delay estimation method provided by the present invention is performed once per P time units, and the newly estimated delay information is substituted for the previous delay information for digital self-interference cancellation. Herein, the time unit can be a slot, a subframe or a radio frame. If the terminal adopts full duplex mode, the period P can be configured by high-layer signaling or downlink control information in the downlink control channel. The terminal does not receive downlink signals when performing synchronization delay estimation.

The synchronization delay estimation method provided by the present invention can also be performed in an aperiodic manner. For example, according to a preset threshold condition, if it is found that the preset threshold condition cannot be met after self-interference cancellation, the synchronization delay estimation is performed again. The aforementioned threshold condition may be the measurement of residual self-interference power after digital self-interference is completed. If the terminal adopts full duplex mode and detects that the preset threshold condition cannot be met, request information can be transmitted through the uplink control channel. After receiving the request information from the terminal, the base station configures time-frequency resources for the synchronization delay estimation of the terminal and transmits the same to the terminal through the downlink control channel or high-layer signaling. After receiving the configuration information, the terminal performs aperiodic synchronization delay estimation and replaces the previous estimation result with the updated estimation result.

FIG. 9 illustrates another example method for estimating the fractional multiple delay according to an embodiment of the present disclosure.

A digital-domain ultra-high resolution synchronization delay estimation method is described with reference to FIG. 9. This method is an improved technique to the traditional MUSIC algorithm. This method can greatly reduce the implementation complexity of the MUSIC algorithm, and is easier to be implemented commercially.

At step 910, an average value of the frequency-domain autocorrelation matrices of at least two extracted subcarriers, which are obtained by extracting from a plurality of subcarriers for transmitting the base sequence at equal intervals, is determined as an average autocorrelation matrix.

The method for calculating the frequency-domain autocorrelation matrix may be as follows: calculating the frequency-domain autocorrelation matrix based on the down-extraction frequency-domain channel estimation, in which the frequency-domain autocorrelation matrix can be used for estimating the part of fractional multiple of the sampling interval in the synchronization delay. The advantage of this design is in that the dimension of the frequency-domain autocorrelation matrix is reduced by way of down-extraction, so as to reduce the computational complexity of the feature space decomposition of the frequency-domain autocorrelation matrix, thus reducing the complexity of the whole algorithm.

Specifically, a way to calculate the frequency-domain autocorrelation matrix by down-extraction frequency-domain channel estimation can as follows: extracting from the frequency-domain channel estimation on subcarriers at equal intervals, calculating the autocorrelation coefficients among the extracted subcarriers, and performing time-domain averaging thereon. For example, it is assumed that $\hat{H}_{LS}^{(l)}[k]$ is the frequency-domain self-interference channel estimation value on subcarrier k in the time-domain symbol l, where k=0, . . . , $N_{sc}$−1, $N_{sc}$ represents the number of subcarriers within the bandwidth of self-interference channel estimation, and l=0, . . . , L−1, L represents the number of OFDM symbols used in the self-interference channel estimation. Generally, we assume that the physical resources used for the self-interference channel estimation start from the subcarrier and OFDM symbol both with index 0. If the interval of down-extraction in frequency domain is Z, then the extracted subcarriers for the frequency-domain autocorrelation matrix used for statistics are k'=$k_0$+Z·n, n=0, 1, . . . , $$\left\lfloor \frac{N_{sc}}{Z} \right\rfloor - 1,$$

where $k_0$ represents the starting index of the extracted subcarriers. The autocorrelation coefficient of the frequency-domain channel can be calculated as $$\hat{r}_{HH}(k'_1, k'_2) = \frac{1}{L}\sum_{l=0}^{L-1} \hat{H}_{LS}^{(l)}[k'_1] \cdot \left(\hat{H}_{LS}^{(l)}[k'_2]\right)^H$$

according to the frequency-domain channel estimation value $\hat{H}_{LS}^{(l)}[k]$ of the $$\left\lfloor \frac{N_{sc}}{Z} \right\rfloor$$

extracted subcarriers, where $$k'_1, k'_2 \in \left\{ k' \middle| k' = k_0 + Z \cdot n, n = 0, 1, \ldots, \left\lfloor \frac{N_{sc}}{Z} \right\rfloor - 1 \right\}.$$

The frequency-domain autocorrelation matrix calculated by the channel estimation of the down-extracted subcarriers is $$\hat{R}_{HH} = \{\hat{r}_{HH}(k'_1, k'_2)\} \in \mathbb{C}\left\lfloor \frac{N_{sc}}{Z} \right\rfloor \times \left\lfloor \frac{N_{sc}}{Z} \right\rfloor.$$

Compared with the frequency-domain autocorrelation matrix with dimension $N_{sc} \times N_{sc}$ in the traditional algorithm, the dimension is reduced by Z times.

Specifically, a way to calculate frequency-domain autocorrelation matrix by down-extraction frequency-domain channel estimation can be as follows: extracting from the frequency-domain channel estimation on subcarriers at an equal interval by multiple times repeatedly, with different starting subcarriers and the same extraction interval, calculating autocorrelation coefficients among the extracted subcarriers according to frequency-domain channel estimation values of subcarriers extracted with the same starting subcarriers and performing time-domain averaging thereon, and then performing frequency-domain averaging on autocorrelation coefficients that are for extraction with different starting subcarriers and have been averaged in time domain, herein the order of frequency-domain averaging and time-domain averaging processing can be exchanged. A specific example is as follows: denoting the frequency-domain autocorrelation matrix obtained when extracting at equal intervals with a starting subcarrier $k_0$ is $$\hat{R}_{HH}^{(k_0)} = \{\hat{r}_{HH}(k'_1, k'_2)\} \hat{r}_{HH}(k'_1, k'_2) = \frac{1}{L}\sum_{l=0}^{L-1} \hat{H}_{LS}^{(l)}[k'_1] \cdot \left(\hat{H}_{LS}^{(l)}[k'_2]\right)^H,$$

where $$k'_1, k'_2 \in \left\{ k' \middle| k' = k_0 + Z \cdot n, n = 0, 1, \ldots, \left\lfloor \frac{N_{sc}}{Z} \right\rfloor - 1 \right\}.$$

It is assumed that the starting subcarriers for extraction at equal intervals can be $k_0 \in \{0, \ldots, Z-1\}$, the number of the obtained frequency-domain autocorrelation matrices corresponding to different starting subcarriers for extraction is Z' and the Z' frequency-domain autocorrelation matrices are averaged in frequency domain, and the expression is $$\hat{R}_{HH} = \frac{1}{Z'}\sum_{k_0=0}^{Z'-1} R_{HH}^{(k_0)}.$$

The advantage of this design lies in further averaging the autocorrelation matrices in frequency domain, which can improve the accuracy of the autocorrelation matrices estimation, thus improving the performance of the whole algorithm.

At step 920, the device determines the fractional multiple delay based on the singular value decomposition of the averaged autocorrelation matrices. Specifically, the device performs singular value decomposition on the obtained frequency-domain autocorrelation matrix, and the autocorrelation matrix can be expressed as: $\hat{R}_{HH} = V\Sigma V^M$. Taking diagonal elements of $\Sigma$, searching for feature vectors corresponding to singular values not exceeding a preset threshold according to the threshold, to form a row full rank matrix denoted as $V_{noise}$. Herein, the preset threshold can be set as the noise variance.

Then, the device estimates the synchronization delay by way of traversal search. Specifically, in the method for estimating the synchronization delay by way of traversal search, the search step size can be set according to the target accuracy of the synchronization delay estimation. For example, if the target accuracy of the synchronization delay is $$\frac{1}{N_e} \cdot T_s,$$

then the search step size $\Delta_{step}$ should satisfy $$\Delta_{step} \leq \frac{1}{N_e}.$$

It is assumed that the preset synchronization delay search section is $[\Delta_{min}, \Delta_{max}]$, with a step size $\Delta_{step}$ the delay amount $\Delta$ is traversed, to construct a column vector $$\vec{f}(\Delta) = \left[1 \quad e^{j2\pi\left(\frac{Z}{N_{FFT}}\right)\Delta} \quad \ldots \quad e^{j2\pi\left(\frac{\left(\left\lceil\frac{N_{SC}}{Z}\right\rceil-1\right)Z}{N_{FFT}}\right)\Delta}\right]^T$$

for each $\Delta$, the function $g(\Delta) = 1/[\vec{f}^H(\Delta) V_{noise} V_{noise}^H \vec{f}(\Delta)]$ is calculated, and then $\Delta$ is traversed to find the first maximum value among all values of the function $g(\Delta)$, $\Delta$ corresponding to the first maximum value is the estimated value of the fractional multiple delay.

FIG. 10 illustrates an example method for performing self-interference cancellation in the frequency domain according to an embodiment of the present disclosure.

A novel frequency-domain self-interference cancellation algorithm is described with reference to FIG. 10, which can achieve the self-interference channel estimation for both linear and nonlinear components in the self-interference signal at the same time. According to the frequency-domain self-interference channel estimation algorithm, the estimated self-interference channels of linear components and nonlinear components can be obtained, which creates the possibility for subsequent self-interference cancellation in the frequency domain. The advantage of self-interference channel estimation and/or self-interference cancellation in frequency domain is that channel estimation and self-interference cancellation processing can be performed respectively on different subcarriers, which reduces the complexity of the algorithm; at the same time, it may not be affected by the synchronization delay between the receiving and transmitting ends of the same device, which has exactly the same phase rotation effect on the frequency-domain self-interference signal (transmitted signal) and the frequency-domain estimated self-interference channel. When the self-interference cancellation is also processed in the frequency domain, the synchronization delay will not affect the performance of the self-interference cancellation, thus it is unnecessary to perform the digital-domain ultra-high accuracy synchronization delay estimation (as shown in FIGS. 5a-9), resulting in lower implementation complexity.

At step 1010, the device groups a plurality of subcarriers for transmitting locally transmitted signals into a plurality of groups of subcarriers.

The purpose of subcarrier grouping is to perform channel estimation on the linear and nonlinear components of self-interference jointly for each group of subcarriers. Specifically, the specific method for grouping subcarriers may be as follows: the subcarriers for transmitting pilot signals are grouped consecutively, and the number of subcarriers included in each group is not less than the total number of linear components and nonlinear components to estimate. For example, it is assumed that the indexes of the subcarriers for transmitting pilot signals are $k_i$, $i=0, \ldots, N_{RS}-1$, where $N_{RS}$ represents the length of pilot signals; the order of linear components and nonlinear components processed by self-interference channel estimation is denoted as $2 \cdot p+1$, $p=1, 2, \ldots$, where $p=0$ represents the linear component and $p>0$ represents the nonlinear components (according to the nonlinear model of power amplifier, a self-interference signal only has odd-order nonlinear components), max $p$ represents the total number of linear components and nonlinear components being processed, then the size of the groups of subcarriers $\bar{P}$ should not be smaller than max $p$ subcarriers, that is, the subcarrier indexes contained in the $j \in [0, \bar{P}-1]$-th group of subcarriers are $\{k_{\bar{P} \cdot j + j_0}, \ldots, k_{\bar{P} \cdot j + j_0 + \bar{P} - 1}\}$, where $j_0 \geq 0$ represents that consecutive grouping starts from the $j_0$-th subcarrier occupied by pilots. Furthermore, the device can also obtain the channel estimation values of linear components and nonlinear components of self-interference of all subcarriers within the bandwidth by way of frequency-domain interpolation.

It is assumed that the pilot sequence for frequency-domain self-interference channel estimation is transmitted on L consecutive OFDM symbols and the symbol indexes are denoted as $l = l_0, \ldots, l_0 + L - 1$, where $l_0$ represents the index of the starting symbol. It is assumed that the time-domain signal form of the pilot sequence for self-interference channel estimation transmitted on the l-th OFDM symbol is $x_l[n]$, where $n = 0, 1, \ldots, N_{FFT}-1$, $N_{FFT}$ represents the size of fast Fourier transform. It is assumed that the receiving end receives the pilot sequence transmitted by the local transmitting end for self-interference channel estimation, and it is assumed that the self-interference frequency-domain signal received on the subcarrier with index $k_i$ is $Y_l[k_i]$, where $i = 0, 1, \ldots, N_{seq}-1$, and $N_{seq}$ is the length of the pilot sequence.

At step 1020, for each group of subcarriers, the device determines the frequency-domain self-interference channels on linear components and nonlinear components on the central subcarrier in the group of subcarriers jointly, and determines the frequency-domain self-interference channels of linear components and nonlinear components on other subcarriers in a plurality of subcarriers through frequency-domain interpolation.

Firstly, the device calculates the linear and nonlinear components of the frequency-domain self-interference signal. Firstly, according to the polynomial model of nonlinear components of the power amplifier, the 2·p+1-th-order components of the time-domain self-interference signal are constructed respectively, such as $x_l^{(p)}[n]=x_l[n]\times|x_l[n]|^{2p}$, $l=l_0, \ldots, l_0+L-1$, $n=0, 1, \ldots, N_{FFT}-1$, where $p=0, 1, \ldots, P-1$, P represents the total number of linear and nonlinear components processed by channel estimation. Then, fast Fourier transform of size $N_{FFT}$ is performed on each order of self-interference signal components on each time-domain symbol (e.g., OFDM symbol) to obtain the frequency-domain form of each order of self-interference signal components on each OFDM symbol, which is denoted as $X_l^{(p)}[k]$, $k=0, 1, \ldots, N_{FFT}-1$, and then the frequency-domain signal of each order of self-interference signal components only on the subcarriers $\{k_i, i=0, 1, \ldots, N_{seq}-1\}$ occupied by transmission of the pilot for self-interference channel estimation is further screened, which is denoted as $X_l^{(p)}[k_i]$, $i=0, 1, \ldots, N_{seq}-1$. The frequency-domain estimation matrix $\overline{X}_l$, $l=l_0, \ldots, l_0+L-1$ on each OFDM symbol is constructed, and the expression is as follows:

$$\overline{X}_l = \begin{bmatrix} X_l^{(0)}[k_0] & \ldots & X_l^{(P-1)}[k_0] \\ \vdots & \ldots & \vdots \\ X_l^{(0)}[k_{N_{seq}-1}] & \ldots & X_l^{(P-1)}[k_{N_{seq}-1}] \end{bmatrix}$$

There are a total of L frequency-domain estimation matrices $\overline{X}_0, \ldots, \overline{X}_{L-1}$.

Then, the device constructs the frequency-domain receiving matrix $\overline{Y}$ of the self-interference signal, and the expression is as follows:

$$\overline{Y} = \begin{bmatrix} Y_{l_0}[k_0] & \ldots & Y_{l_0}[k_{N_{seq}-1}] \\ \vdots & \ldots & \vdots \\ Y_{l_0+L-1}[k_0] & \ldots & Y_{l_0+L-1}[k_{N_{seq}-1}] \end{bmatrix}$$

Next, the device groups the subcarriers $\{k_i, i=0, 1, \ldots, N_{seq}-1\}$ in granularity of P, and performs joint self-interference channel estimation of linear components and nonlinear components on each group independently. It is assumed that the indexes of the subcarriers included in the $j \in [0, P-1]$-th sub-carrier group are $\{k_{\overline{P}\cdot j+j_0}, \ldots, k_{\overline{P}\cdot j+j_0}+P-1\}$. For simplicity, we assume $j_0=0$, that is, the indexes of the subcarriers included in the j-th group of subcarriers are $\{kP\cdot j, \ldots, k_{P\cdot j+P-1}\}$. The columns P·j to P·j+P−1 in the frequency-domain receiving matrix $\overline{Y}$ are deleted to form the frequency-domain receiving vector $\vec{y}_j$ of the j-th group of subcarriers, and its dimension is LP×1, and is expressed as follows $$\vec{y}_j = [Y_{l_0}[k_{P\cdot j}] \ldots Y_{l_0}[k_{P\cdot j+P-1}] \ldots Y_{l_0}^{+L-1}[k_{P\cdot j}] \ldots Y_{l_0}^{+L-1}[k_{P\cdot j+P-1}]]^T$$

Similarly, the rows P·j to P·j+P−1 in the frequency-domain estimation matrix $\overline{X}_0, \ldots, \overline{X}_{L-1}$ to form the frequency-domain estimation matrix $\tilde{X}_j$ of the j-th group of subcarriers, and its dimension is LP×P, and is expressed as follows $$\tilde{X}_j = \begin{bmatrix} X_0^{(0)}[k_{P\cdot j}] & \ldots & X_0^{(P-1)}[k_{P\cdot j}] \\ \vdots & \ldots & \vdots \\ X_0^{(0)}[k_{P\cdot j+P-1}] & \ldots & X_0^{(P-1)}[k_{P\cdot j+P-1}] \\ X_1^{(0)}[k_{P\cdot j}] & \ldots & X_1^{(P-1)}[k_{P\cdot j}] \\ \vdots & \ldots & \vdots \\ X_1^{(0)}[k_{P\cdot j+P-1}] & \ldots & X_1^{(P-1)}[k_{P\cdot j+P-1}] \\ \vdots & \vdots & \vdots \end{bmatrix}$$

Assuming that least square channel estimation is adopted, the estimated value of each order of self-interference channels on the group j of subcarriers is $\vec{H}_j=[(\tilde{X}_j)^H \tilde{X}_j]^{-1}(\tilde{X}_j)^H \vec{y}_j$. Note that the self-interference channel estimation values of linear components and nonlinear components obtained for each group of subcarriers is the channel estimation values of the central subcarrier within the group of subcarriers, which is denoted as $k_j'=k_{P\cdot j+[P/2]}$, $j=0, \ldots, P-1$.

Then, the device obtains the self-interference channels of linear and nonlinear components on other subcarriers with indexes $\{k \in [0, N_{FFT}]| k \neq k_j', j=0, 1, \ldots, \lfloor N_{seq}P \rfloor\}$ through frequency-domain interpolation. The frequency-domain self-interference channel of each order of components on all subcarriers is denoted as $h^{(p)}[n]$, $p=0, \ldots, P-1$, $n=0, 1, \ldots, N_{FFT}-1$.

At step 1030, the device deletes the reconstructed self-interference signal from the received signal based on the determined frequency-domain self-interference channel.

The device calculates the linear and nonlinear components of the frequency-domain self-interference signal of the signal transmitted on the OFDM symbols of a non-pilot signal, that is, according to the nonlinear component polynomial model of the power amplifier, the 2·p+1-th order components of the time-domain self-interference signal are respectively constructed, for example, $s^{(p)}[n]=s[n]\times|s[n]|^{2p}$, $n=0, 1, \ldots, N_{FTT}-1$, where s[n] represents the locally transmitted baseband signal and $p=0, 1, \ldots, P-1$, P represents the total number of linear and nonlinear components processed by the channel estimation. Then, the fast Fourier transform of size $N_{FFT}$ is performed on each order of the self-interference signal components on the OFDM symbols of the non-pilot signal, to obtain the frequency-domain form of the each order of the self-interference signal components on each OFDM symbol, which is denoted as $S^{(p)}[k]$, $k=0, 1, \ldots, N_{FFT}-1$. The reconstructed self-interference signal is deleted from the received signal sub-carrier-by-subcarrier, and the process is $y[n]-\Sigma_{p=0}^{P-1} S^{(p)}[n]\cdot h^{(p)}[n]$, $n=0, 1, \ldots, N_{FFT}-1$, where $S^{(p)}[n]\cdot h^{(p)}[n]$ is the reconstructed self-interference signal of the 2p+1-th order component.

Embodiment 2

According to ITU's estimation, by 2020, the global monthly mobile data traffic will reach 62 Exa Bytes (1 EB=$2^{30}$ GB), and from 2020 to 2030, global mobile data services will even increase at an annual rate of about 55%. In addition, the proportion of video services and machine-to-machine communication services in mobile data services will gradually increase. In 2030, video services will be 6 times of non-video services, and machine-to-machine communication services will account for about 12% of mobile data services ("IMT traffic estimates for the years 2020 to 2030, Report ITU-R M.2370-0").

The rapid growth of mobile data services, especially the exponential growth of high-definition video and ultra-highdefinition video services, has put forward higher requirements on the transmission rate of wireless communication. In order to meet the growing demand for mobile traffic, people need to propose new technologies on the basis of 4G or 5G to further improve the transmission rate and throughput of wireless communication systems. The full-duplex technology can further improve the spectrum utilization on the existing system. Different from the traditional half-duplex system using time-domain (time division duplex, TDD) or frequency-domain (frequency division duplex, FDD) orthogonal division for uplink and downlink, the full-duplex system allows the user's uplink and downlink to transmit simultaneously in the time and frequency domains. Therefore, the full-duplex system can theoretically achieve twice the throughput of the half-duplex system. However, because the uplink and downlink are at the same frequency and at the same time, the transmitted signal of the full-duplex system will produce strong self-interference on the received signal, and the self-interference signal may even be more than 120 dB higher than the noise floor. Therefore, in order for the full-duplex system to work, the core issue is to design a solution to eliminate the self-interference to reduce the strength of the self-interference signal to at least the same level as the noise floor.

At present, there are many methods for self-interference elimination, which are roughly divided into antenna elimination methods, analog elimination methods, and digital elimination methods. Antenna elimination methods mainly refer to reducing the strength of the self-interference signal reaching the receiving antenna with manners of physical isolation and cancellation of received and transmitted signals and so on by designing the circuits of transmitting and receiving antennas. Analog elimination methods mainly refer to the elimination of self-interference signals in the analog domain of the receiving link (that is, before the analog-to-digital conversion). In the common self-interference cancellation structure, the antenna cancellation and the analog cancellation exist at the same time, which together make the signal input to the analog-to-digital converter have a reasonable dynamic range. Considering the implementation costs of the antenna cancellation circuit and the analog cancellation circuit, the digital cancellation is usually used after the analog cancellation in the engineering implementation to further process the residual self-interference signal after the analog cancellation.

As the name implies, digital elimination methods refer to the methods of eliminating self-interference signals in the digital domain at the receiving end (that is, after the analog-to-digital conversion). The basic principle is that a full-duplex device transmits a known reference signal on a specific physical resource and simultaneously receives a self-interference signal. According to the transmitted known reference signal, the full-duplex device can estimate the self-interference channel. On other physical resources, the full-duplex device simultaneously performs reception and transmission, and the transmitted signal causes interference to the receiving end through the self-interference channel. The full-duplex device can reconstruct the self-interference signal on these physical resources based on the estimated self-interference channel, and delete the reconstructed self-interference signal from the received digital-domain signal. It is worth noting that, in order to ensure the accuracy of the self-interference channel estimation, no full-duplex data transmission is performed on the physical resources for transmitting the reference signal used for the self-interference channel estimation. The physical resource occupied by the reference signal is called the pilot overhead. The greater the pilot overhead, the greater the transmission rate loss. In systems that use OFDM (Orthogonal Frequency Division Multiplexing) waveforms, such as LTE (Long-term Evolution), NR (New Radio), etc., the conventional operation to reduce the pilot overhead is transmission of the reference signal on several OFDM symbols in only one slot. Assuming that the channel in a slot is unchanged, the remaining OFDM symbols in the slot can use the channel estimated by the reference signal to perform self-interference deletion. However, due to the random phase noise between the transmitting end and the receiving end, different OFDM symbols within the same slot have different common phase errors (CPE). Therefore, the frequency-domain equivalent channels of different OFDM symbols have different phase deflections, which cause the channel estimation results of different OFDM symbols within the same slot to be unable to be reused.

In the existing NR system, it is supported that the phase tracking reference signal (PTRS) is used to estimate the phase noise produced by terminal transmission and base station reception, or the phase noise produced by base station transmission and terminal reception. The main principle is that if the same reference signal symbol is transmitted on different OFDM symbols and the same subcarrier, the phase differences existing on the received signal of the reference signal symbol of different OFDM symbols and the same subcarrier are the common phase error differences of the different OFDM symbols, which can be used to compensate the estimated channels so as to acquire the estimated channels on different OFDM symbols. Similarly, the PTRS can also be used for common phase error compensation of self-interference channels in full-duplex devices, so that self-interference channel estimations on different OFDM symbols can be acquired with lower channel estimation pilot overhead. However, it should be noted that the configuration and design of PTRS in NR cannot fully meet the requirements of phase noise estimation in a full-duplex system. For example, when the modulation and coding scheme is lower than the configured threshold, and/or the number of the allocated physical resource blocks (PRBs) is lower than the configured threshold, no PTRS is transmitted, and the time-domain density of PTRS is determined by the modulation and coding scheme, and its frequency-domain density is determined by the number of the allocated PRBs. However, for full-duplex transmission, the transmission conditions and time-domain and frequency-domain densities of PTRS have no direct relationship with the modulation and coding scheme and the number of the allocated PRBs, and are decided only by the device performance and hardware design of local oscillators and the like of full-duplex devices (for example, full-duplex base stations, full-duplex terminals, full-duplex IABs, etc.). On the other hand, in order to ensure the accuracy of the self-interference phase error estimated by the full-duplex device, it is necessary to configure that there is no remote transmission in the receiving direction configured on the physical resources of the PTRS. The remote transmission refers to the transmission transmitted by the base station and received by the terminal, or the transmission received by the base station and transmitted by the terminal. Although the downlink rate matching configuration and the uplink invalid symbol configuration (which can be used to configure no transmission in the receiving direction) are supported in the current NR system, only the configuration with an OFDM symbol as the basic unit is supported for both. However, PTRS needs to support the configuration of the same subcarrier and different OFDM symbols, which cannot be supported by the current system design.

The present disclosure aims to design a reference signal configuration and transmission method, which can be used for phase tracking of self-interference channels on the full-duplex base station side or terminal side, and an uplink and/or downlink invalid subcarrier configuration and corresponding transmission method, which is used to ensure that there is no remote reception when the reference signal for phase tracking is transmitted, thereby improving the self-interference channel CPE estimation performance of the full-duplex device, or to ensure that there is no remote transmission when the reference signal for phase tracking is received, thereby avoiding the influence of residual self-interference on the remote channel CPE estimation.

In the present disclosure, the meaning of full duplex includes but is not limited to the same communication device transmitting a signal and receiving a signal on the same time-domain and frequency-domain resources, and the same communication device transmitting a signal and receiving a signal respectively on different frequency-domain resources at the same time, but locally transmitted signals produce self-interference to received signals. The forms of a base station include but are not limited to eNB (eNodeB), gNB (gNodeB), IAB-DU (Integrated Access and Backhaul-distributed unit), etc. The forms of a terminal include but are not limited to mobile terminals, computer terminals, IAB-MT (Integrated Access and Backhaul-mobile-termination), etc.

Embodiment 2-1

In this embodiment, a reference signal configuration and transmission method is proposed. The reference signal can be used for phase tracking of a self-interference channel on the full-duplex base station side or terminal side. Different from the reference signal used for phase tracking (hereinafter referred to as the phase tracking reference signal) in the existing system, such as the PTRS in the NR system, the reference signal proposed in the present disclosure, which can be used for phase tracking of the self-interference channel on the full-duplex base station side or terminal side, is called a second reference signal or a second phase tracking reference signal.

It is worth noting that the phase tracking reference signal can be reused to realize the function of phase tracking of the self-interference channel on the full-duplex base station side or terminal side, that is, there is no need to transmit the second phase tracking reference signal. For example, when the time-domain density of the PTRS is $L_{PT-RS}=1$, as shown in FIG. 11, that is, the PTRS transmits a PTRS pilot symbol on every OFDM symbol on the same subcarrier. In the following description of this embodiment, the second phase tracking reference signal does not include the reused phase tracking reference signal unless otherwise stated.

A transmission method of a second phase tracking reference signal is characterized in that the physical resource to which the second phase tracking reference signal is mapped is different from the physical resource to which the phase tracking reference signal is mapped in at least one dimension of the time domain or the frequency domain, and the transmission directions of the second phase tracking reference signal and the phase tracking reference signal are the same and are uplink or downlink. Specifically, the frequency domain of the physical resource elements to which the second phase tracking reference signal is mapped is different from the frequency domain of the physical resource elements to which the phase tracking reference signal is mapped. A specific implementation may be that the second phase tracking reference signal and the phase tracking reference signal are mapped on physical resource elements of the same OFDM symbol and different subcarriers which may be subcarriers with different indexes within the same physical resource block or subcarriers on different physical resource blocks. The beneficial effect of this implementation is that when the phase tracking reference signal cannot meet or cannot fully meet the phase tracking of the self-interference channel, the second phase tracking reference signal transmitted independently can be configured on a subcarrier different from that of the phase tracking reference signal. For example, when the physical uplink shared channel enables transformed precoding, the PTRS is dispersed on all subcarriers transmitted by the physical uplink shared channel through the transformed precoding. When such PTRS is used to perform CPE estimation of the self-interference channel on the full-duplex terminal side, it is interfered by the downlink received signal, the phase tracking of the self-interference channel on the terminal side cannot be accurately performed, and the second phase tracking reference signal is needed to realize phase tracking of the full-duplex self-interference channel.

Or, specifically, the time domain of the physical resource elements to which the second phase tracking reference signal is mapped is different from the time domain of the physical resource elements to which the phase tracking reference signal is mapped. A specific implementation may be that the second phase tracking reference signal and the phase tracking reference signal are mapped on physical resource elements of the same subcarrier and different OFDM symbols. The beneficial effect of this implementation is that it can be used for a case that the configured phase tracking reference signal does not meet the requirements of phase tracking of the full-duplex self-interference channel. For example, when the time-domain density and/or frequency-domain density are sparse, the second phase tracking reference signal for complementing the phase tracking reference signal is configured to jointly realizes the function of tracking of the full-duplex self-interference channel, thereby reducing the pilot overhead of the second phase tracking reference signal. For example, when the time-domain density of PTRS is $L_{PT-RS}=4$, that is, PTRS transmits one PTRS pilot symbol every 4 OFDM symbols on the same subcarrier. At this time, the second phase tracking reference signal can transmit the same pilot symbol as that of the PTRS on the remaining OFDM symbols on the same subcarrier. At this time, the phase tracking reference signal and the second phase tracking reference signal on the subcarrier are commonly used for the phase tracking of the full-duplex self-interference channel on each OFDM symbol. FIG. 12 shows an example.

Or, specifically, the physical resource elements to which the second phase tracking reference signal is mapped and the physical resource elements to which the phase tracking reference signal is mapped are different in both the time domain and the frequency domain. A specific implementation may be that in a case that the phase tracking reference signal is not configured or does not meet the transmission condition, the second phase tracking reference signal is configured to implement phase tracking of the self-interference channel on the full-duplex base station side or terminal side. The advantage of this design is that the second phase tracking reference signal is configured only under the premise that the reference signal configuration of the existing system cannot meet the phase tracking of the self-interference channel, thereby reducing the pilot overhead of the phase tracking of the full-duplex self-interference channel.

A transmission method of a second phase tracking reference signal is characterized in that the pilot sequence of the second phase tracking reference signal is determined according to the demodulation reference signal sequence on the subcarrier where the reference signal is located, for example, using the same sequence generation manner as that of the PTRS. Specifically, when the subcarrier to which the second phase tracking reference signal is mapped is the same as the subcarrier to which the phase tracking reference signal is mapped, the pilot sequence of the second phase tracking reference signal is the same as that of the phase tracking reference signal, and the transmit power of the second phase tracking reference signal is the same as that of the phase tracking reference signal. Furthermore, in the above case, the transmit power of the second phase tracking reference signal/the phase tracking reference signal is the same as the transmit power of the demodulation reference signal. The beneficial effect of this implementation is that since the transmit power of the self-interference signal will affect the nonlinear characteristics of the self-interference signal, the influence on the tracking performance of the self-interference channel due to different nonlinear characteristics can be avoided by assuring that the transmit power of the second phase tracking reference signal/the phase tracking reference signal is the same as the transmit power of the demodulation reference signal.

A configuration method of a second phase tracking reference signal is characterized in that a terminal acquires configuration parameters of the second phase tracking reference signal, the configuration parameters including at least one of the following: indication information indicating whether the second phase tracking reference signal is enabled, the time-domain density of the second phase tracking reference signal, the frequency-domain density of the second phase tracking reference signal, the time-domain position of the second phase tracking reference signal, the frequency-domain position of the second phase tracking reference signal, the antenna port of the second phase tracking reference signal, and the transmit power of the second phase tracking reference signal.

Specifically, the method of the terminal acquiring the indication information indicating whether the second phase tracking reference signal is enabled includes at least one of the following: identifying the downlink control channel to acquire the indication information, identifying the high-layer signaling to acquire the indication information, and identifying the media access control (MAC) information of the downlink shared channel to acquire the indication information. The manner of acquiring the indication information may be explicit or implicit. For example, a specific implementation of explicitly acquiring the indication information may be to directly acquire the indication field where the indication information indicating whether the second phase tracking reference signal is enabled is located. A specific implementation of implicitly acquiring the indication information may be that the terminal acquires the indication information related to whether the full-duplex transmission is performed, and whether the second phase tracking reference signal is enabled is associated with whether the full-duplex transmission is performed. The beneficial effect of this implementation is that the configuration signaling overhead of the second phase tracking reference signal can be saved by implicitly acquiring the configuration of the second phase tracking reference signal through the indication information related to the full-duplex transmission.

Specifically, the method of the terminal acquiring the time-domain density and/or the frequency-domain density of the second phase tracking reference signal includes at least one of the following: acquiring the corresponding configuration parameters by identifying the downlink control channel, acquiring the corresponding configuration parameters by identifying the high-layer signaling, acquiring the corresponding configuration parameters by identifying the media access control (MAC) information of the downlink shared channel, and using default values. Specifically, the default value of the time-domain density of the second phase tracking reference signal may be L=1, that is, all physical resource elements at the subcarriers of the second phase tracking reference signal transmit the pilot symbols of the phase tracking reference signal. The physical resource elements do not include physical resource elements transmitting other reference signals, and the other reference signals include at least one of the demodulation reference signal and the phase tracking reference signal. Specifically, the default value of the frequency-domain density of the second phase tracking reference signal may be transmitted once in the frequency domain within the bandwidth allocated for the uplink shared channel or the downlink shared channel. This design takes into consideration that the phase tracking of the self-interference channel is actually estimation of the CPE of the self-interfering channel under the condition of an extremely high signal-to-noise ratio, so there is no need to transmit the second phase tracking reference signal multiple times in the frequency domain (multiple transmissions in the frequency domain is for the purpose of achieving the improvement in the equivalent signal-to-noise ratio of CPE estimation on average in the frequency domain). For example, let K=max $N_{PRB}$ ($N_{PRB}$ is the number of physical resource blocks contained in the bandwidth allocated for the uplink shared channel or downlink shared channel), then according to the calculation formula of the frequency-domain mapping position of the PTRS in the existing system, the second phase tracking reference signal is transmitted only once on the mapped initial physical resource block within the allocated bandwidth. Or, specifically, the default value of the time-domain density of the second phase tracking reference signal is the configuration value of the time-domain density of the phase tracking reference signal (PTRS), and the default value of the frequency-domain density of the second phase tracking reference signal is the configuration value of the frequency-domain density of the phase tracking reference signal (PTRS).

Specifically, the method of the terminal acquiring the time-domain position of the second phase tracking reference signal includes at least one of the following: acquiring the corresponding configuration parameters by identifying the downlink control channel, acquiring the corresponding configuration parameters by identifying the high-layer signaling, acquiring the corresponding configuration parameters by identifying the media access control (MAC) information of the downlink shared channel, and using default values. Specifically, the time-domain position of the second phase tracking reference signal is used to indicate the slot to which the second phase tracking reference signal is mapped, and/or the position of the starting OFDM symbol to which the second phase tracking reference signal is mapped within the slot. A specific manner of indicating the slot to which the second phase tracking reference signal is mapped may be indicating one or more slots in which the second phase tracking reference signal is transmitted among multiple slots. For example, by the way of a bitmap, the slots in which the second phase tracking reference signal is mapped among the N slots are indicated with N bits: the i-th bit in the N bits indicates whether the second phase tracking reference signal is mapped to the i-th slot. The beneficial effect of this implementation is that the second phase tracking reference signal can be configured only on several slots where full-duplex transmission occurs among multiple slots (for example, full-duplex communication is performed only on several slots in the cross-slot transmission of the physical channel), and the second phase tracking reference signal does not need to be transmitted in the remaining slots, thereby saving the pilot overhead. Specifically, the default value of the time-domain position of the second phase tracking reference signal may be the same slot as that of the phase tracking reference signal and the position of the starting OFDM symbol within the slot.

Specifically, the method of the terminal acquiring the frequency-domain position of the second phase tracking reference signal includes at least one of the following: acquiring the corresponding configuration parameters by identifying the downlink control channel, acquiring the corresponding configuration parameters by identifying the high-layer signaling, acquiring the corresponding configuration parameters by identifying the media access control (MAC) information of the downlink shared channel, and using default values. The frequency-domain position of the second phase tracking reference signal includes at least one of the following contents: indicating the position of the initial physical resource block mapping the second phase tracking reference signal; indicating the position of the subcarrier mapping the second phase tracking reference signal within the physical resource block. A specific implementation for the terminal to acquire the position of the subcarrier to which the second phase tracking reference signal is mapped within the physical resource block may be that the terminal acquires the position of the subcarrier to which the second phase tracking reference signal is mapped within the physical resource block according to the resource element offset configuration of the second phase tracking reference signal and the association relationship between the port of the second phase tracking reference signal and the port of the demodulation reference signal. Preferably, the association relationship between the port of the second phase tracking reference signal and the port of the demodulation reference signal is the same as the association relationship between the port of the phase tracking reference signal and the port of the demodulation reference signal. Preferably, the resource element offset configuration of the second phase tracking reference signal is different from the resource element offset configuration of the phase tracking reference signal. For example, the resource element offset of the second phase tracking reference signal and the resource element offset of the phase tracking reference signal are configured separately by using different signaling. The beneficial effect of this design is that assuming that the physical resource block to which the second phase tracking reference signal is mapped is the same as the physical resource block to which the phase tracking reference signal is mapped, it can be supported that the second phase tracking reference signal and the phase tracking reference signal are configured with the same resource element offset and thereby mapped on the same subcarrier, and it can be also supported that the second phase tracking reference signal and the phase tracking reference signal are configured with different resource element offsets and thereby mapped on different subcarriers. The former can reuse the phase tracking reference signal to the greatest extent, thereby achieving the phase tracking of the full-duplex self-interference channel so as to save the pilot overhead of the second phase tracking reference signal. The latter can configure an independent second phase tracking reference signal when the phase tracking reference signal cannot meet the phase tracking requirements of the full-duplex self-interference channel. Or, a specific implementation for the terminal to acquire the position of the subcarrier to which the second phase tracking reference signal is mapped within the physical resource block may be that the terminal transmits the second phase tracking reference signal outside the bandwidth of uplink transmission. The subcarrier transmitting the second phase tracking reference signal may be a subcarrier having a fixed relative position relationship with the uplink transmission bandwidth, for example, the out-of-bandwidth subcarrier closest to the starting subcarrier of uplink transmission, or the out-of-bandwidth subcarrier closest to the termination subcarrier of uplink transmission, etc. The advantage of this design method is that when transform-domain precoding is enabled for uplink transmission, transmitting the second phase tracking reference signal may not affect operations such as the transform-domain precoding and the resource mapping of uplink transmission.

Further, a specific implementation for the terminal to acquire the position of the physical resource block to which the second phase tracking reference signal is mapped may be acquiring the initial physical resource block index to which the phase tracking reference signal is mapped as the initial physical resource block index to which the second phase tracking reference signal is mapped, and then calculating all physical resource block indexes to which the second phase tracking reference signal is mapped according to the frequency-domain density of the second phase tracking reference signal, where the frequency-domain density configuration of the second phase tracking reference signal and the frequency-domain density configuration of the phase tracking reference signal can be the same or different. Preferably, the frequency-domain density of the second phase tracking reference signal is greater than the frequency-domain density of the phase tracking reference signal, and an example is given in FIG. 13. The beneficial effect of this design for the position of the physical resource block to which the second phase tracking reference signal is mapped is that mapping of the second phase tracking reference signal can be configured to reuse a part of the frequency-domain resources of the phase tracking reference signal, thereby reducing the additional pilot overhead caused by the second phase tracking reference signal. When the phase tracking reference signal is not configured or transmitted, one way to determine the initial physical resource block index of the second phase tracking reference signal may be to use the same initial physical resource block index calculation formula as the phase tracking reference signal, for example, to determine it according to the RNTI (Radio Network Temporary Identity) of the downlink control channel scheduling transmission. Or, another specific implementation for the terminal to acquire the position of the physical resource block to which the second phase tracking reference signal is mapped may be that the terminal acquires the physical resource block granularity configuration of the second phase tracking reference signal, and determines one or more physical resource blocks within the bandwidth that meet the configured physical resource block granularity as the physical resource block to which the second phase tracking reference signal is mapped, according to the physical resource block index allocated for the uplink/downlink shared channel carrying the second phase tracking reference signal, where the physical resource block granularity of the second phase tracking reference signal is denoted as $N_{PRB}^{2PTRS}$, and the index value of the physical resource block (denoted as $i_{PRB}^{2PTRS}$) to which the second phase tracking reference signal is mapped is a multiple of $N_{PRB}^{2PTRS}$, that is, $i_{PRB}^{2PTRS} \mod N_{PRB}^{2PTRS}=0$, or the index value of the physical resource block to which the second phase tracking reference signal is mapped is a multiple of $N_{PRB}^{2PTRS}$ after being superimposed a fixed offset, that is, $(i_{PRB}^{2PTRS}-\Delta_{PRB}^{2PTRS}) \mod N_{PRB}^{2PTRS}=0$, where $\Delta_{PRB}^{2PTRS}$ is the fixed offset value of the physical resource block index and may be a default value or a cell-specific configuration value. The beneficial effect of this design is that when a full-duplex base station schedules the uplink transmission of one terminal and the downlink reception of another terminal, in order to ensure the performance of the CPE estimation of the self-interference channel on the base station side, it is necessary to configure the physical resource for the downlink second phase tracking reference signal to be an invalid physical resource for uplink transmission. Since the user of uplink transmission and the user of downlink reception are different users, it is necessary to indicate the position of the physical resource block of the downlink second phase tracking reference signal to the user of uplink transmission. Restricting the position of the physical resource block to which the second phase tracking reference signal is mapped is beneficial to reduce the signaling overhead for indicating the position of the physical resource block to which the second phase tracking reference signal is mapped.

Specifically, the terminal acquiring the antenna port configuration of the second phase tracking reference signal includes at least acquiring the number of antenna ports. The method of the terminal acquiring the antenna port configuration of the second phase tracking reference signal includes at least one of the following: acquiring the corresponding configuration parameters by identifying the downlink control channel, acquiring the corresponding configuration parameters by identifying the high-layer signaling, acquiring the corresponding configuration parameters by identifying the media access control (MAC) information of the downlink shared channel, and using default values. Specifically, a specific way for the terminal to acquire the antenna port configuration of the second phase tracking reference signal is to acquire the number of antenna ports of the phase tracking reference signal as the number of antenna ports of the second phase tracking reference signal. The beneficial effect of this way is to reuse the configuration parameters of the existing phase tracking reference signal and reduce the signaling overhead for configuring the second phase tracking reference signal. Furthermore, the terminal may determine the association relationship between the various ports of the second phase tracking reference signal and the demodulation reference signal according to the number of ports of the second phase tracking reference signal and the criterion that the number of ports thereof is the same as that of the phase tracking reference signal. When the phase tracking reference signal is not configured and/or the number of antenna ports of the second phase tracking reference signal is not configured, the number of antenna ports of the second phase tracking reference signal takes the maximum value of the number of antenna ports that can be supported by the phase tracking reference signal with the same transmission direction as that thereof, where the transmission direction includes uplink or downlink.

Specifically, the method of the terminal acquiring the transmit power of the second phase tracking reference signal includes at least one of the following: acquiring the corresponding configuration parameters by identifying the downlink control channel, acquiring the corresponding configuration parameters by identifying the high-layer signaling, acquiring the corresponding configuration parameters by identifying the media access control (MAC) information of the downlink shared channel, and using default values. A specific way for the terminal to acquire the transmit power of the second phase tracking reference signal may be that the transmit power of the second phase tracking reference signal is the same as the transmit power of the demodulation reference signal, or the transmit power of the second phase tracking reference signal is the same as the transmit power of the phase tracking reference signal.

One of the characteristics of the physical channel transmission method related to the second phase tracking reference signal is that when the second phase tracking reference signal is a downlink reference signal, the terminal receives the downlink physical channel carrying the second phase tracking reference signal and/or the second phase tracking reference signal. Specifically, the resource elements to which the downlink physical channel carrying the downlink second phase tracking reference signal received by the terminal is mapped do not include the resource elements to which the second phase tracking reference signal is mapped. And, further, the terminal calculates rate matching according to the remaining resource elements in the physical resource of the downlink physical channel that do not contain the resource elements to which the second phase tracking reference signal is mapped, and demodulates and decodes the received downlink physical channel according to the result of the rate matching. Through this implementation, the resource of the second phase tracking reference signal does not affect the demodulation and decoding of the downlink physical channel.

One of the characteristics of the physical channel transmission method related to the second phase tracking reference signal is that when the second phase tracking reference signal is an uplink reference signal, the terminal transmits the uplink physical channel carrying the uplink second phase tracking reference signal and/or the second phase tracking reference signal. Specifically, the resource elements to which the uplink physical channel carrying the uplink second phase tracking reference signal transmitted by the terminal is mapped do not include the resource elements to which the second phase tracking reference signal is mapped. And, further, the terminal performs rate matching according to the remaining resource elements in the uplink physical channel that do not contain the resource elements to which the second phase tracking reference signal is mapped, so that the terminal does not affect the demodulation and decoding of the uplink physical channel on the base station side when transmitting the second phase tracking reference signal. Or, specifically, the resource elements to which the uplink physical channel carrying the uplink second phase tracking reference signal transmitted by the terminal is mapped include the resource elements to which the second phase tracking reference signal is mapped, and the terminal transmits the second phase tracking reference signal in the resource elements to which the second phase tracking reference signal is mapped when transmitting the uplink physical channel. In this way, the terminal does not affect the signal generation of the uplink physical channel on the terminal side when transmitting the second phase tracking reference signal. For example, when the transform-domain precoding is enabled for uplink transmission on the terminal side, the transform-domain precoding of the uplink physical channel will not be affected because the second phase tracking reference signal occupies several resource elements of the uplink physical channel.

Embodiment 2-2

In this embodiment, an uplink/downlink invalid resource configuration and corresponding transmission method is proposed, which can be used to ensure that there is no signal in the receiving direction of a specific subcarrier for a full-duplex base station or terminal, where the specific subcarrier can be the subcarrier to which the phase tracking reference signal and/or the second phase tracking reference signal is mapped in the transmission direction of the full-duplex base station or terminal, so as to ensure the performance of the full-duplex base station or terminal estimating the CPE of the self-interference channel based on the transmitted phase tracking reference signal and/or second phase tracking reference signal; or, the specific subcarrier can also be the subcarrier to which the phase tracking reference signal is mapped in the receiving direction of the full-duplex base station or terminal, so as to ensure that the full-duplex base station or terminal is not affected by residual self-interference when estimating the CPE of the remote channel based on the phase tracking reference signal, ensuring the estimation performance of the CPE of the remote channel.

An uplink/downlink invalid resource configuration method is characterized in that a terminal acquires the configuration of invalid resources for uplink transmission and/or downlink reception, where the invalid resources include resource elements of one or more discontinuous subcarriers located on the same OFDM symbol. Uplink transmission includes uplink physical signals and uplink physical channels; downlink reception includes downlink physical signals and downlink physical channels. Further, when the terminal acquires the configuration of the invalid resources for uplink transmission, the physical resource elements to which the uplink transmission of the terminal is mapped do not include the resource elements included in the uplink invalid resources, and rate matching is performed according to the remaining resource elements in the uplink physical channel of the terminal that do not contain the uplink invalid resource elements. In the same way, when the terminal acquires the configuration of the invalid resources for downlink reception, the physical resource elements to which the downlink reception of the terminal is mapped do not include the resource elements included in the downlink invalid resources, and rate matching is performed according to the remaining resource elements in the downlink physical channel of the terminal that do not contain the downlink invalid resource elements. In this way, the invalid resource configuration does not affect the uplink or downlink demodulation and decoding.

An uplink/downlink invalid resource configuration method is characterized in that a terminal acquires the positions of the subcarriers of the invalid resources for uplink and/or downlink reception. Three methods for acquiring the positions of the subcarriers of the invalid resources for uplink and/or downlink reception are as follows:

Method 1: The terminal acquires one or more invalid resource patterns by identifying the high-layer signaling, and acquires the triggered invalid resource pattern(s) by identifying the downlink control channel, thereby determining the subcarrier position of the invalid resource. The invalid resource pattern includes at least one pattern, which is characterized by containing one or more invalid subcarriers, where the meaning of the invalid subcarriers is resource elements of the same subcarrier but different OFDM symbols. The purpose of such a pattern design is to ensure that the invalid resource pattern configuration can conform to the mapping pattern of the phase tracking reference signal and/or the second phase tracking reference signal, so as to ensure the performance of the CPE estimation of the self-interference channel or the CPE estimation of the remote channel by reasonably configuring the invalid resource pattern.

Method 2: The terminal acquires the starting subcarrier position of the invalid resource, and then calculates the index(es) of the physical resource block(s) where the subcarrier(s) of the invalid resource is located according to the frequency-domain density configuration of the invalid resource. The frequency-domain density of the invalid resource can be indicated by the high-layer signaling or take a fixed value. For example, assuming that the starting subcarrier position of the terminal to acquire the invalid resource is $k_0$, and the frequency-domain density of the invalid resource is $N_{ISC}$, the terminal can calculate the subcarrier position of the invalid resource within the bandwidth of its uplink transmission/downlink reception as $k_{ISC}=k_0+M \cdot N_{ISC}$, M=0, 1, ..., where $k_{ISC}$ is a subcarrier within the bandwidth of uplink transmission/downlink reception of the terminal. Note that the starting subcarrier of the invalid resource acquired by the terminal may be one or more. The terminal can acquire the starting subcarrier configuration of the invalid resource by identifying the downlink control channel. In this way, flexible configuration of invalid resources can be realized to a certain extent. For example, the starting subcarrier of the invalid resource can be flexibly configured.

Method 3: The terminal acquires the index(es) of the physical resource block(s) where the subcarrier(s) of the invalid resource is located and the relative index(es) of the subcarrier(s) of the invalid resource in the physical resource block respectively. Further, the specific way for the terminal to acquire the index(es) of the physical resource block(s) where the invalid resource is located may be that the terminal acquires an explicit indication for the index(es) of the physical resource block(s) of the invalid resource by identifying the downlink control channel or high-layer signaling, for example, the terminal acquires a bitmap for indicating whether each of the N physical resource blocks allocated for uplink transmission or downlink reception contains an invalid resource by identifying the downlink control channel. This way gives flexibility to the configuration of invalid resources, and is suitable for scenarios where the number N of physical resource blocks is small and the signaling overhead is small.

Or, the specific way for the terminal to acquire the index(es) of the physical resource block(s) where the subcarrier(s) of the invalid resource is located may be that the terminal acquires the index(es) of the starting physical resource block(s) where the subcarrier(s) of the invalid resource is located, and determines the physical resource block(s) where the subcarrier(s) of the invalid resource is located according to the frequency-domain density of the invalid resource. The frequency-domain density of the invalid resource can be indicated by high-layer signaling or take a fixed value. In this way, the overhead of indicating invalid resources can be reduced by sacrificing the flexibility of frequency-domain configuration of invalid resources. Furthermore, the way for the terminal to acquire the index(es) of the starting physical resource block(s) of the invalid resource may be that the terminal acquires an explicit indication for the index(es) of the starting physical resource block(s) of the invalid resource by identifying the downlink control channel or high-layer signaling, for example, if the terminal acquires the indication that the i-th physical resource block among the multiple physical resource blocks N allocated for uplink transmission or downlink reception is the starting physical resource block of the invalid resource, the required number of bits is log$_2$N bits. And, if there is a certain granularity restriction, denoted as N$_{IPRB}$ (for example, when the second phase tracking reference signal is only mapped to the physical resource block whose index is a multiple of N$_{IPRB}$), on the physical resource block of the invalid resource, the number of bits required for explicitly indicating that the i-th physical resource block among the multiple physical resource blocks N allocated for uplink transmission or downlink reception is the starting physical resource block of the invalid resource can be greatly reduced to $$\log_2 \frac{N}{N_{IPRB}} \text{ bits.}$$

Or, another specific implementation for the terminal to acquire the index(es) of the starting physical resource block(s) of the invalid resource in an explicit indication manner may be to indicate, in a case of taking the starting physical resource block allocated for uplink transmission or downlink reception as the reference position, the physical resource block index offset of the starting physical resource block of the invalid resource relative to the reference position. Preferably, 1 bit can be used to indicate that the physical resource block index offset of the starting physical resource block of the invalid resource relative to the reference position is 0 or 1; or, it can be indicated by 2 bits that the physical resource block index offset of the starting physical resource block of the invalid resource relative to the reference position is {0,1,2,3} or {0, ±1, 2} or {0, ±1, −2}. The specific number of bits can be acquired by the terminal by identifying the high-layer signaling or downlink control channel. For example, the number of bits used to determine to indicate the physical resource block index offset of the starting physical resource block of the invalid resource relative to the reference position can be 1 bit or 2 bits, and/or 1 bit is used to determine whether the position of the starting physical resource block of the invalid resource can be indicated by the way of indicating the physical resource block index offset relative to the reference position. This design manner takes into consideration that the frequency-domain density configuration of the phase tracking reference signal can be mapping at intervals of 2 physical resource blocks or 4 physical resource blocks (1 bit corresponds to a case where the frequency-domain density of the phase tracking reference signal is 2 physical resource blocks, while 2 bits correspond to a case where the frequency-domain density of the phase tracking reference signal is 4 physical resource blocks), and is applicable to greatly reduce the signaling overhead for indicating invalid resources in a case where the index position of the starting physical resource block of the phase tracking reference signal is before the initial physical resource block of uplink transmission or downlink reception where invalid resources need to be configured.

Or, a specific way for the terminal to acquire the index(es) of the physical resource block(s) where the subcarrier(s) of the invalid resource is located may be that the terminal calculates the physical resource block(s) that meets the physical resource block index granularity within the uplink transmission or downlink reception bandwidth according to the physical resource block index granularity of the invalid resource. The physical resource block index granularity of the invalid resource can be indicated by high-layer signaling or take a fixed value. For example, assuming that the physical resource block index granularity of the invalid resource is N$_{IPRB}$, the physical resource block index i$_{PRB}$ of the invalid resource needs to meet i$_{PRB}$ mod N$_{IPRB}$=0. By making the index(es) of the physical resource block(s) where the subcarrier of the invalid resource is located meet a certain index granularity, the number of bits for indicating the index(es) of the physical resource block(s) where the subcarrier of the invalid resource is located can be reduced, that is, the signaling overhead can be reduced.

In addition to the index(es) of the physical resource block(s) where the invalid resource is located, the relative index(es) of the subcarrier(s) of the invalid resource in the physical resource block(s) also needs to be acquired by the terminal. A specific implementation for the terminal to acquire the relative index(es) of the subcarrier(s) of the invalid resource in the physical resource block(s) may be that the terminal acquires an explicit indication for the relative index(es) of the subcarrier(s) of the invalid resource in the physical resource block(s) by identifying the downlink control channel and/or high-layer signaling. For example, the terminal acquires a bitmap indicating whether the N subcarriers in any physical resource block(s) where the invalid resource is located are subcarriers of the invalid resource by identifying the downlink control channel and/or high-layer signaling. Preferably, the number of bits in the bitmap is 12, that is, the i-th bit in the bitmap indicates whether the i-th subcarrier in any physical resource block(s) where the invalid resource is located is the subcarrier of the invalid resource. This indication manner can ensure the flexibility of the subcarrier configuration of the invalid resource. Or, a specific implementation for the terminal to acquire the relative index(es) of the subcarrier(s) of the invalid resource in the physical resource block(s) may also be that the terminal acquires the starting position of the subcarrier of the invalid resource in the physical resource block and the number of continuous subcarriers occupied by the invalid resource from the starting position in the physical resource block by identifying the downlink control channel and/or high-layer signaling. Furthermore, the relative indexes of the subcarriers of the invalid resources in the physical resource blocks where all invalid resources are located may be the same. This configuration manner can ensure that the configuration of invalid resources can cover all possible relative subcarrier positions of the second phase tracking reference signal and/or the phase tracking reference signal within the physical resource block, reducing the signaling overhead. For example, according to the position of the mapped subcarrier of the phase tracking reference signal in the existing protocol, the number of continuous subcarriers occupied by the invalid resource from the starting position in the physical resource block can be indicated as 4 or 6 by 1 bit; or, joint indication may be performed according to the possible combination of the starting subcarrier position of the phase tracking reference signal and the number of continuous subcarriers in the protocol, for example, 3 bits can be used to indicate that {the starting position of the subcarrier of the invalid resource in the physical resource block, the number of continuous subcarriers occupied by the invalid resource from the starting position in the physical resource block} is one of {0,4}, {0,6}, {2,4}, {6,4}, {6,6}, and {8,4}.

Or, a specific implementation for the terminal to acquire the relative index(es) of the subcarrier(s) of the invalid resource in the physical resource block(s) may also be that the terminal acquires the starting position of the subcarrier of the invalid resource in the physical resource block as well as whether each subcarrier in a segment of continuous subcarriers of the invalid resource from the starting position in the physical resource block is a subcarrier of the invalid resource by identifying the downlink control channel and/or high-layer signaling. Preferably, the way for the terminal to acquire the starting position of the subcarrier of the invalid resource in the physical resource block and the number of continuous subcarriers of the invalid resource from the starting position in the physical resource block may be through joint indication, thereby reducing the signaling overhead. Preferably, the way for the terminal to acquire whether each subcarrier in a segment of continuous subcarriers of the invalid resource from the starting position in the physical resource block is a subcarrier of the invalid resource may be a bitmap.

An uplink/downlink invalid resource configuration method is characterized in that a terminal acquires the time-domain position of the invalid resource for uplink transmission and/or downlink reception. Specifically, the time-domain position includes at least the slot in which the invalid resource takes effect.

A specific implementation may be that the terminal identifies the high-layer signaling to acquire one or more invalid resource patterns, acquires triggered invalid resource pattern(s) by identifying the downlink control channel, and acquires the time-domain position of the invalid resource for uplink transmission and/or downlink reception according to the time-domain configuration of the invalid resource patterns. This way of semi-statically configuring (through high-layer signaling) patterns and indicating triggered pattern(s) by dynamic configuration (through the downlink control channel) can greatly reduce the signaling overhead under the premise of ensuring the configuration flexibility.

Another specific implementation may be that the terminal uses one or more slots scheduled for uplink transmission or downlink reception as the slot position where the invalid resource takes effect. Therefore, it can be ensured that a suitable slot position of the invalid resource can be configured in multi-slot uplink uplink transmission or downlink reception. Specifically, the terminal may use the first slot scheduled for uplink transmission or downlink reception as the slot in which the invalid resource takes effect. Or, specifically, the terminal may also acquire the indication of the position of the slot in which the invalid resource takes effect among the slots scheduled for uplink transmission or downlink reception by identifying the high-layer signaling and/or the downlink control channel. For example, assuming that the maximum number of slots scheduled for uplink transmission or downlink reception is 8, whether each of the 8 slots is a triggered invalid resource is indicated by a bitmap.

FIG. 14 illustrates a flow chart of a signal configuration and transmission method according to an embodiment of the present disclosure. The method includes: in step 1401, a terminal acquires resource configuration information from a base station; and in step 1402, the terminal performs uplink transmission and/or downlink reception based on the acquired resource configuration information.

In an embodiment, the resource configuration information is used to configure a reference signal, and the physical resource to which the reference signal is mapped is different from the physical resource to which a PTRS with the same transmission direction is mapped in at least one of the time domain or the frequency domain, where the transmission direction of the reference signal is at least one of uplink and downlink.

In another embodiment, the resource configuration information is information about invalid resource configuration, where the invalid resource configuration is a subcarrier-level invalid resource configuration. In a further embodiment, acquiring the resource configuration information for an invalid resource includes at least one of the following: acquiring the subcarrier position of the invalid resource for uplink transmission and/or downlink reception, and acquiring the time-domain position of the invalid resource for uplink transmission and/or downlink reception.

The forms of the above-mentioned base station include but are not limited to eNB, gNB, IAB-DU, etc.; and the forms of the above-mentioned terminal include but are not limited to mobile terminals, computer terminals, IAB-MT, etc. In a case that the signal is a reference signal used for phase tracking, the reference signal may have the same transmission direction as that of the PTRS and be uplink or downlink, and the physical resource to which the reference signal is mapped is different from the physical resource to which the PTRS is mapped in at least one of the time domain or the frequency domain.

In an embodiment, the reference signal and the phase tracking reference signal are respectively mapped on physical resource elements of the same OFDM symbol and different subcarriers, and the different subcarriers are subcarriers with different indexes within the same physical resource block or subcarriers on different physical resource blocks.

In an embodiment, the reference signal and the phase tracking reference signal are respectively mapped on resource elements of the same subcarrier and different OFDM symbols.

In an embodiment, the pilot sequence of the reference signal is determined according to the demodulation reference signal sequence on the subcarrier where the reference signal is located. In a further embodiment, when the subcarrier to which the reference signal is mapped is the same as the subcarrier to which the phase tracking reference signal is mapped, the pilot sequence of the reference signal is the same as that of the phase tracking reference signal, and/or the transmit power of the reference signal is the same as that of the phase tracking reference signal.

In an embodiment, the resource configuration information used for the reference signal includes at least one of the following: an indication signal indicating whether the reference signal is enabled; the time-domain density of the reference signal; the frequency-domain density of the reference signal; the time-domain position of the reference signal; the frequency-domain position of the reference signal; the antenna port of the reference signal; and the transmit power of the reference signal.

In various embodiments, acquiring at least one of the resource configuration information used for the reference signal includes acquiring by at least one of the following methods of: identifying a downlink control channel, identifying high-layer signaling, identifying media access control (MAC) information of a downlink shared channel, and using a default value.

In an embodiment, acquiring the indication information indicating whether the reference signal is enabled includes directly acquiring the indication field where the indication information indicating whether the reference signal is enabled is located or acquiring indication information related to whether full-duplex transmission is performed, whether the reference signal is enabled being associated with whether full-duplex transmission is performed.

In an embodiment, the default value of the time-domain density of the reference signal is L=1, the default value of the frequency-domain density is transmitting once in the frequency domain within the bandwidth allocated for an uplink shared channel or a downlink shared channel.

In an embodiment, the default value of the time-domain density of the reference signal is the configuration value of the time-domain density of the PTRS, and the default value of the frequency-domain density of the reference signal is the configuration value of the frequency-domain density of the PTRS.

In various embodiments, the acquisition of the frequency-domain position of the reference signal includes at least one of the following: the acquisition of the indication of the position of the physical resource block mapping the reference signal; and the acquisition of the indication of the position of the subcarrier mapping the reference signal within the physical resource block. The acquisition of the position of the subcarrier mapping the reference signal within the physical resource block includes acquiring the position of the subcarrier mapping the reference signal within the physical resource block according to the resource element offset configuration of the reference signal and the association relationship between the port of the reference signal and the port of the demodulation reference signal.

In an embodiment, the resource element offset configuration of the reference signal and the resource element offset configuration of the phase tracking reference signal are configured separately by using different signaling, and the association relationship between the port of the reference signal and the port of the demodulation reference signal is the same as the association relationship between the port of PTRS and the port of the demodulation reference signal.

In an embodiment, the reference signal is transmitted on a subcarrier that has a fixed relative positional relationship with the uplink transmission bandwidth. In a further embodiment, the subcarrier having a fixed relative positional relationship with the uplink transmission bandwidth includes at least one of the following: the out-of-bandwidth subcarrier closest to the starting subcarrier of the uplink transmission or the out-of-bandwidth subcarrier closest to the termination subcarrier of the uplink transmission.

In an embodiment, the frequency-domain position of the second phase tracking reference signal includes at least one of the following: indicating the position of the physical resource block mapping the second phase tracking reference signal; indicating the position of the subcarrier mapping the second phase tracking reference signal within the physical resource block. In an embodiment, acquiring the position of the subcarrier mapping the second phase tracking reference signal within the physical resource block includes: acquiring the position of the subcarrier mapping the second phase tracking reference signal within the physical resource block according to the resource element offset configuration of the second phase tracking reference signal and the association relationship between the port of the second phase tracking reference signal and the port of the demodulation reference signal. In a further embodiment, the association relationship between the port of the second phase tracking reference signal and the port of the demodulation reference signal is the same as the association relationship between the port of the phase tracking reference signal and the port of the demodulation reference signal. In another embodiment, the resource element offset configuration of the second phase tracking reference signal is different from the resource element offset configuration of the phase tracking reference signal, for example, the resource element offset of the second phase tracking reference signal and the resource element offset of the phase tracking reference signal are configured separately by using different signaling. In an embodiment, acquiring the position of the subcarrier mapping the second phase tracking reference signal within the physical resource block includes transmitting the second phase tracking reference signal outside the bandwidth of the uplink transmission. The subcarrier transmitting the second phase tracking reference signal may be a subcarrier having a fixed relative position relationship with the uplink transmission bandwidth, for example, the out-of-bandwidth subcarrier closest to the starting subcarrier of uplink transmission, or the out-of-bandwidth subcarrier closest to the termination subcarrier of uplink transmission, etc.

In an embodiment, acquiring the position of the physical resource block mapping the second phase tracking reference signal includes: acquiring the initial physical resource block index to which the phase tracking reference signal is mapped as the initial physical resource block index to which the second phase tracking reference signal is mapped, and then calculating all physical resource block indexes mapping the second phase tracking reference signal according to the frequency-domain density of the second phase tracking reference signal, where the frequency-domain density configuration of the second phase tracking reference signal and the frequency-domain density configuration of the phase tracking reference signal can be the same or different. In an embodiment, when the phase tracking reference signal is not configured or transmitted, determining the initial physical resource block index of the second phase tracking reference signal includes determining by using the same initial physical resource block index calculation formula as that of the phase tracking reference signal. In an alternative embodiment, acquiring the position of the physical resource block mapping the second phase tracking reference signal includes: acquiring the physical resource block granularity configuration of the second phase tracking reference signal, and determining one or more physical resource blocks that meet the configured physical resource block granularity within the bandwidth as the physical resource blocks to which the second phase tracking reference signal is mapped according to the physical resource block index allocated for the uplink/downlink shared channel carrying the second phase tracking reference signal.

In an embodiment, acquiring the antenna port configuration of the second phase tracking reference signal includes at least acquiring the number of antenna ports.

In an embodiment, acquiring the antenna port configuration of the second phase tracking reference signal may include acquiring the number of antenna ports of the phase tracking reference signal as the number of antenna ports of the second phase tracking reference signal. In a further embodiment, the association relationship between the various ports of the second phase tracking reference signal and the demodulation reference signal may be determined according to the number of ports of the second phase tracking reference signal and the criterion that the number of ports thereof is the same as that of the phase tracking reference signal. When the phase tracking reference signal is not configured and/or the number of antenna ports of the second phase tracking reference signal is not configured, the number of antenna ports of the second phase tracking reference signal takes the maximum value of the number of antenna ports that can be supported by the phase tracking reference signal with the same transmission direction as that thereof, where the transmission direction includes uplink or downlink.

In various embodiments, the transmit power of the second phase tracking reference signal can be acquired by one of the following two ways: the transmit power of the second phase tracking reference signal is the same as the transmit power of the demodulation reference signal, or the transmit power of the second phase tracking reference signal is the same as the transmit power of the phase tracking reference signal.

In an embodiment, the method further includes: when the reference signal is a downlink reference signal, receiving the downlink physical channel carrying the reference signal and/or the reference signal; and calculating rate matching according to remaining resource elements in the physical resource of the downlink physical channel that do not contain the resource elements to which the reference signal is mapped, and demodulating and decoding the received downlink physical channel according to the result of the rate matching.

In a further embodiment, the method further includes: when the reference signal is an uplink reference signal, transmitting the uplink physical channel carrying the uplink reference signal and the reference signal; and performing rate matching according to the remaining resource elements in the uplink physical channel that do not contain the resource elements of the reference signal or transmitting the reference signal in the resource elements to which the reference signal is mapped when transmitting the uplink physical channel.

In another specific embodiment, the resource configuration information is information about an invalid resource configuration, where the invalid resource configuration is a subcarrier-level invalid resource configuration.

In an embodiment, the invalid resource include resource elements of one or more discontinuous subcarriers located on the same OFDM symbol, or resource elements of different OFDM symbols and the same subcarrier.

In various embodiments, acquiring the resource configuration information for the invalid resource includes at least one of the following: acquiring the subcarrier position of the invalid resource of uplink transmission and/or downlink reception; and acquiring the time-domain position of the invalid resource of uplink transmission and/or downlink reception.

In various embodiments, when the configuration of the invalid resource of uplink transmission is acquired, the physical resource elements to which the uplink transmission is mapped do not include the resource elements included in the uplink invalid resource, and rate matching is performed according to the remaining resource elements in the uplink physical channel that do not contain the uplink invalid resource elements; and/or when the configuration of the invalid resource of downlink reception is acquired, the physical resource elements to which the downlink reception is mapped do not include the resource elements included in the downlink invalid resource, and rate matching is performed according to the remaining resource elements in the downlink physical channel that do not contain the downlink invalid resource elements.

In various embodiments, acquiring the subcarrier position of the invalid resource of uplink transmission and/or downlink reception includes acquiring by at least one of the following methods of: acquiring one or more invalid resource patterns by identifying high-layer signaling, and acquiring triggered invalid resource pattern(s) by identifying a downlink control channel, thereby determining the subcarrier position of the invalid resource; acquiring the starting subcarrier position of the invalid resource, and then calculating the index(es) of the physical resource block(s) where the subcarrier(s) of the invalid resource is located according to the frequency-domain density configuration of the invalid resource, the frequency-domain density of the invalid resource being indicated by the high-layer signaling or taking a fixed value; and acquiring the index(es) of the physical resource block(s) where the subcarrier(s) of the invalid resource is located and the relative index(es) of the subcarrier of the invalid resource in the physical resource block respectively.

In various embodiments, acquiring the index(es) of the physical resource block(s) where the subcarrier(s) of the invalid resource is located includes at least one of the following methods of: acquiring the index of the starting physical resource block where the subcarrier of the invalid resource is located, and determining the physical resource block(s) where the subcarrier of the invalid resource is located according to the frequency-domain density of the invalid resource, the frequency-domain density of the invalid resource being indicated by the high-layer signaling or taking the fixed value; and according to the physical resource block index granularity of the invalid resource, calculating the physical resource block(s) that meets the physical resource block index granularity within the uplink transmission or downlink reception bandwidth, the physical resource block index granularity of the invalid resource being indicated by high-layer signaling or taking a fixed value.

In various embodiments, acquiring the relative index of the subcarrier of the invalid resource in the physical resource block includes at least one of the following methods of: acquiring an explicit indication of the relative index(es) of the subcarrier(s) of the invalid resource in the physical resource block(s) by identifying the downlink control channel and/or the high-layer signaling; and acquiring the starting position of the subcarrier of the invalid resource in the physical resource block and whether each subcarrier is a subcarrier of the invalid resource in a segment of continuous subcarriers of the invalid resource from the starting position in the physical resource block, by identifying the downlink control channel and/or the high-layer signaling.

In various embodiments, acquiring the time-domain position of the invalid resource of uplink transmission and/or downlink reception includes acquiring by at least one of the following methods of: acquiring one or more invalid resource patterns by identifying high-layer signaling, acquiring triggered invalid resource pattern(s) by identifying a downlink control channel, and acquiring the time-domain position of the invalid resource of uplink transmission and/or downlink reception according to the time-domain configuration of the invalid resource patterns; and taking one or more slots scheduled by uplink transmission or downlink reception as the slot positions where the invalid resource takes effect.

According to an embodiment of the present disclosure, there is provided a terminal including: a transceiver; and a processor configured to control the transceiver to execute any one of all the methods described above.

According to another aspect of the present disclosure, there is provided a method executed by a base station in a wireless communication system. The method includes: generating resource configuration information; and transmitting the resource configuration information to a terminal, so that the terminal executes at least one of the above methods.

According to another aspect of the present disclosure, a base station in a wireless communication system includes: a transceiver; and a processor configured to generate resource configuration information and control the transceiver to transmit the resource configuration information to a terminal, so that the terminal executes at least one of the methods as described above. In various specific embodiments, the resource configuration information generated by the base station includes at least one of the following: the resource configuration information about the reference signal (the second phase tracking reference signal) as mentioned above; and the information on invalid resource configuration as mentioned above.

In an embodiment, when the resource configuration information is used for a downlink reference signal, the base station transmits the downlink reference signal to the terminal. In another embodiment, when the resource configuration information is used for an uplink reference signal, the base station receives the uplink reference signal from the terminal, and/or receives other uplink transmissions affected by the configuration of the uplink reference signal.

FIG. 15 illustrates a device 1500 in a wireless communication system.

Referring to FIG. 15, the device 1500 includes a transmitter 1510, receiver 1520 and a processor 1530. The transmitter 1510 is configured to transmit signals to the outside. The receiver 1520 is configured to receive signals from the outside. The processor 1530 is configured to compensate one of the locally transmitted signal transmitted by the transmitter 1510 and the received signal corresponding to the locally transmitted signal and received by the receiver 1520, according to an integral multiple delay in a synchronization delay between the receiver 1520 and the transmitter 1510 of the device 1500, for the locally transmitted signal and the received signal; and determine a fractional multiple delay in the synchronization delay based on one of a collection of the received signal and the compensated locally transmitted signal and a collection of the locally transmitted signal and the compensated received signal, depending on which one of the locally transmitted signal and the received signal is compensated. The device 1500 can be implemented in the form of hardware, software or a combination of hardware and software, so that it can perform all methods described in the present disclosure.

An aspect of the present disclosure provides a method performed by a device in a wireless communication system, comprising: for a first locally transmitted signal transmitted by the device and a first received signal corresponding to the first locally transmitted signal and received by the device, compensating one of the first locally transmitted signal and the first received signal, according to a first synchronization delay part of a synchronization delay between a receiver and a transmitter of the device, wherein the first synchronization delay part is an integral multiple of a predefined baseband sampling interval of the device in the synchronization delay; determining a second synchronization delay part of the synchronization delay based on one of a collection of the first received signal and the compensated first locally transmitted signal and a collection of the first locally transmitted signal and the compensated first received signal, depending on which one of the first locally transmitted signal and the first received signal is compensated, wherein the second synchronization delay part is a fractional multiple of the predefined baseband sampling interval of the device in the synchronization delay.

Optionally, the step of determining the second synchronization delay part comprises: generating a first plurality of time-domain synchronization sequences based on one of the first locally transmitted signal and the compensated first locally transmitted signal, depending on which one of the first locally transmitted signal and the first received signal is compensated; determining the second synchronization delay part, based on the first plurality of time-domain synchronization sequences and one of the first received signal and the compensated first received signal, depending on which one of the first locally transmitted signal and the first received signal is compensated.

Optionally, the step of generating the first plurality of time-domain synchronization sequences comprises: generating the first plurality of time-domain synchronization sequences by performing time-domain interpolation on one of the first locally transmitted signal and the compensated first locally transmitted signal, depending on which one of the first locally transmitted signal and the first received signal is compensated.

Optionally, the step of generating the first plurality of time-domain synchronization sequences comprises: generating the first plurality of time-domain synchronization sequences by adding frequency-domain linear phases to one of the first locally transmitted signal and the compensated first locally transmitted signal, depending on which one of the first locally transmitted signal and the first received signal is compensated.

Optionally, the first locally transmitted signal is determined by one of the following steps: concatenating a plurality of time-domain sequences to form the first locally transmitted signal; and concatenating at least two consecutive time-domain symbols in the time-domain signals transmitted by the device to form the first locally transmitted signal.

Optionally, the step of determining the second synchronization delay part comprises: taking the first plurality of time-domain synchronization sequences as a second plurality of time-domain synchronization sequences, or selecting the second plurality of time-domain synchronization sequences from the first plurality of time-domain synchronization sequences through a coarse synchronization process; and, determining the second synchronization delay part based on the second plurality of time-domain synchronization sequences and one of the first received signal and the compensated first received signal, depending on which one of the first locally transmitted signal and the first received signal is compensated.

Optionally, selecting the second plurality of time-domain synchronization sequences from the first plurality of time-domain synchronization sequences through the coarse synchronization process comprises: extracting R groups of sequences at an interval of R from one time-domain symbol of a signal obtained by oversampling one of the first received signal and the compensated first received signal at a predefined oversampling rate R, depending on which one of the first locally transmitted signal and the first received signal is compensated; determining a coarse synchronization result according to indexes of a group of sequences having correlation peak values with one of the first locally transmitted signal and the compensated first locally transmitted signal among the R groups of sequences, depending on which one of the first locally transmitted signal and the first received signal is compensated.

Optionally, selecting the second plurality of time-domain synchronization sequences from the first plurality of time-domain synchronization sequences through the coarse synchronization process comprises one of the following steps: based on the coarse synchronization result, determining a group of time-domain synchronization sequences from R groups of time-domain synchronization sequences obtained by dividing the first plurality of time-domain synchronization sequences according to R, and compensating the determined group of time-domain synchronization sequences based on the coarse synchronization result as the second plurality of time-domain synchronization sequences; and based on the coarse synchronization result, determining a first group of time-domain synchronization sequences from R groups of time-domain synchronization sequences obtained by dividing the first plurality of time-domain synchronization sequences according to R, and taking the first group of time-domain synchronization sequences as the second plurality of time-domain synchronization sequences.

Optionally, the step of determining the second synchronization delay part based on the second plurality of time-domain synchronization sequences and one of the first received signal and the compensated first received signal, depending on which one of the first locally transmitted signal and the first received signal is compensated comprises one of the followings: in case that the second plurality of time-domain synchronization sequences have been compensated based on the coarse synchronization result, depending on which one of the first locally transmitted signal and the first received signal is compensated, determining the second synchronization time delay part according to one time-domain synchronization sequence which has the largest correlation peak value with one of the first received signal and the compensated first received signal among the second time-domain synchronization sequences; in case that the second plurality of time-domain synchronization sequences are not compensated based on the coarse synchronization result, depending on which one of the first locally transmitted signal and the first received signal is compensated, determining the second synchronization delay part according to one time-domain synchronization sequence having a correlation peak value with a signal obtained by compensating one of the first received signal and the compensated first received signal based on the coarse synchronization result among the second time-domain synchronization sequences.

Optionally, the step of determining the second synchronization delay part based on the second plurality of time-domain synchronization sequences and one of the first received signal and the compensated first received signal, depending on which one of the first locally transmitted signal and the first received signal is compensated comprises: determining a channel estimation matrix corresponding to each of the second plurality of time-domain synchronization sequences; determining a residual self-interference caused by the second synchronization delay part corresponding to each time-domain synchronization sequence; and determining the second synchronization delay part based on a time-domain synchronization sequence with a smallest residual self-interference among the second plurality of time-domain synchronization sequences, wherein the step of determining the residual self-interference caused by the second synchronization delay part corresponding to each time-domain synchronization sequence comprises one of the followings: in case that the second plurality of time-domain synchronization sequences have been compensated based on the coarse synchronization result, determining a residual self-interference caused by the second synchronization delay part corresponding to each time-domain synchronization sequence based on each time-domain synchronization sequence and one of the first received signal and the compensated first received signal, depending on which one of the first locally transmitted signal and the first received signal is compensated; and in case that the second plurality of time-domain synchronization sequences have not been compensated based on the coarse synchronization result, determining a residual self-interference caused by the second synchronization delay part corresponding to each time-domain synchronization sequence, based on a signal obtained by compensating one of the first received signal and the compensated first received signal based on the coarse compensation result and each time-domain synchronization sequence, depending on which one of the first locally transmitted signal and the first received signal is compensated.

Optionally, the step of determining the second synchronization delay part comprises: determining an average value of frequency-domain autocorrelation matrices of at least two extracted subcarriers obtained by extracting from a plurality of subcarriers used for transmitting a second locally transmitted signal at equal intervals, as an average autocorrelation matrix; determining the second synchronization delay part based on singular value decomposition of the average autocorrelation matrix.

Optionally, the step of compensating the first locally transmitted signal according to the first synchronization delay part comprises one of the followings: performing time-domain cyclic shift on the first locally transmitted signal based on the determined first synchronization delay part; and performing frequency-domain phase compensation on the first locally transmitted signal based on the determined first synchronization delay part.

Optionally, the step of compensating the first received signal according to the first synchronization delay part comprises: changing a receiving window for the first received signal based on the determined first synchronization delay part.

Optionally, for the second locally transmitted signal transmitted by the device and a second received signal received by the device and corresponding to the second locally transmitted signal, compensating one of the second locally transmitted signal and the second received signal according to the synchronization delay determined based on the first synchronization delay part and the second synchronization delay part; and determining a self-interference channel according to one of a collection of the second locally transmitted signal and the compensated second received signal and a collection of the second received signal and the compensated second locally transmitted signal, depending on which one of the second locally transmitted signal and the second received signal is compensated; reconstructing a self-interference signal based on the determined self-interference channel, and deleting the reconstructed self-interference signal from the received signal.

Another aspect of the present disclosure provides a method performed by a device in a wireless communication system, comprising: grouping a plurality of subcarriers for transmitting a locally transmitted signal into a plurality of groups of subcarriers; for each group of subcarriers, jointly determining frequency-domain self-interference channels of linear and nonlinear components on the central subcarriers in the groups of subcarriers, and determining frequency-domain self-interference channels of linear and nonlinear components on other subcarriers in the plurality of subcarriers through frequency-domain interpolation; and deleting a reconstructed self-interference signal from the received signal based on the determined frequency-domain self-interference channels.

Yet another aspect of the present disclosure provides a device in a wireless communication system, comprising: a transmitter configured to transmit a signal; a receiver configured to receive a signal; and a controller configured to, for a first locally transmitted signal transmitted by the device and a first received signal corresponding to the first locally transmitted signal and received by the device, compensate one of the first locally transmitted signal and the first received signal, according to a first synchronization delay part of a synchronization delay between the receiver and the transmitter of the device, wherein the first synchronization delay part is an integral multiple of a predefined baseband sampling interval of the device in the synchronization delay; determine a second synchronization delay part of the synchronization delay based on one of a collection of the first received signal and the compensated first locally transmitted signal and a collection of the first locally transmitted signal and the compensated first received signal, depending on which one of the first locally transmitted signal and the first received signal is compensated, wherein the second synchronization delay part is a fractional multiple of the predefined baseband sampling interval of the device in the synchronization delay.

Yet another aspect of the present disclosure provides a device in a wireless communication system, comprising a transmitter configured to transmit a signal; a receiver configured to receive a signal; and a controller configured to group a plurality of subcarriers for transmitting a locally transmitted signal into a plurality of groups of subcarriers; for each group of subcarriers, jointly determine frequency-domain self-interference channels of linear and nonlinear components on the central subcarriers in the groups of subcarriers, and determine frequency-domain self-interference channels of linear and nonlinear components on other subcarriers in the plurality of subcarriers through frequency-domain interpolation; and deleting a reconstructed self-interference signal from the received signal based on the determined frequency-domain self-interference channels.

Various embodiments of the present disclosure may be implemented as computer readable codes embodied on a computer readable recording medium from a specific perspective. The computer readable recording medium is any data storage device that can store data readable by a computer system. Examples of the computer-readable recording medium may include read only memory (ROM), random access memory (RAM), optical disk read only memory (CD-ROM), magnetic tape, floppy disk, optical data storage device, carrier (e.g., data transmission via the Internet), and the like. The computer readable recording medium may be distributed through computer systems connected via a network, and thus the computer readable codes may be stored and executed in a distributed manner. Moreover, functional programs, codes, and code segments for implementing various embodiments of the present disclosure may be easily interpreted by those skilled in the art to which the embodiments of the present disclosure are applied.

It will be understood that embodiments of the present disclosure may be implemented in hardware, software, or combination of hardware and software. The software may be stored as program instructions or computer readable codes executable on a processor on a non-transitory computer readable medium. Examples of the non-transitory computer readable recording medium include magnetic storage media (e.g., ROM, floppy disk, hard disk, etc.) and optical recording media (e.g., CD-ROM, digital video disk (DVD), etc.). The non-transitory computer readable recording medium may also be distributed across network-coupled computer systems such that the computer readable codes are stored and executed in a distributed manner. The medium may be read by a computer, stored in a memory, and executed by a processor. Various embodiments may be implemented by a computer or a portable terminal including a controller and a memory, and the memory may be an example of a non-transitory computer readable recording medium adapted to store a program(s) having instructions to implement embodiments of the present disclosure. The present disclosure may be implemented by a program having codes for implementing the apparatuses and methods described in the claims, which is stored in a machine (or computer) readable storage medium. The program may be electronically carried on any medium, such as a communication signal transmitted via a wired or wireless connection, and the present disclosure suitably includes equivalents thereof.

What has been described above is only specific implementation of the present disclosure, but the scope of protection of the present disclosure is not limited to this. Any skilled in the art can make various changes or substitutions within the technical scope of the present disclosure, and these changes or substitutions should be encompassed within the scope of protection of the present disclosure. Therefore, the scope of protection of the present disclosure should refer to the scope of protection of the claims.

Although one or more embodiments have been described with reference to the accompanying drawings, those of ordinary skill in the art will understand that various changes in form and details can be made without departing from the spirit and scope defined by the appended claims.

The invention claimed is:

1. A method performed by a device in a wireless communication system, comprising:
   for a first transmitted signal transmitted by the device and a first received signal corresponding to the first transmitted signal and received by the device, compensating one of the first transmitted signal and the first received signal, according to a first synchronization delay part of a synchronization delay between a receiver and a transmitter of the device, wherein the first synchronization delay part is an integral multiple of a predefined baseband sampling interval of the device in the synchronization delay;
   determining a second synchronization delay part of the synchronization delay based on one of a collection of the first received signal and the compensated first transmitted signal and a collection of the first transmitted signal and the compensated first received signal, depending on which one of the first transmitted signal and the first received signal is compensated, wherein the second synchronization delay part is a fractional multiple of the predefined baseband sampling interval of the device in the synchronization delay.

2. The method of claim 1, wherein the step of determining the second synchronization delay part comprises:
   generating a first plurality of time-domain synchronization sequences based on one of the first transmitted signal and the compensated first transmitted signal, depending on which one of the first transmitted signal and the first received signal is compensated;
   determining the second synchronization delay part based on the first plurality of time-domain synchronization sequences and one of the first received signal and the compensated first received signal, depending on which one of the first transmitted signal and the first received signal is compensated.

3. The method of claim 2, wherein the step of generating the first plurality of time-domain synchronization sequences comprises:
generating the first plurality of time-domain synchronization sequences by performing time-domain interpolation on one of the first transmitted signal and the compensated first transmitted signal, depending on which one of the first transmitted signal and the first received signal is compensated.

4. The method of claim 2, wherein the step of generating the first plurality of time-domain synchronization sequences comprises:
generating the first plurality of time-domain synchronization sequences by adding frequency-domain linear phases to one of the first transmitted signal and the compensated first transmitted signal, depending on which one of the first transmitted signal and the first received signal is compensated.

5. The method of claim 1, wherein the first transmitted signal is determined by one of the following steps:
concatenating a plurality of time-domain sequences to form the first transmitted signal; and
concatenating at least two consecutive time-domain symbols in time-domain signals transmitted by the device to form the first transmitted signal.

6. The method of claim 2, wherein the step of determining the second synchronization delay part comprises:
taking the first plurality of time-domain synchronization sequences as a second plurality of time-domain synchronization sequences, or selecting the second plurality of time-domain synchronization sequences from the first plurality of time-domain synchronization sequences through a coarse synchronization process; and,
determining the second synchronization delay part based on the second plurality of time-domain synchronization sequences and one of the first received signal and the compensated first received signal, depending on which one of the first transmitted signal and the first received signal is compensated.

7. The method of claim 6, wherein the coarse synchronization process comprises:
extracting R groups of sequences at an interval of R from one time-domain symbol of a signal obtained by oversampling one of the first received signal and the compensated first received signal at a predefined oversampling rate R, depending on which one of the first transmitted signal and the first received signal is compensated;
determining a coarse synchronization result according to the indexes of a group of sequences having correlation peak values with one of the first transmitted signal and the compensated first transmitted signal among the R groups of sequences, depending on which one of the first transmitted signal and the first received signal is compensated.

8. The method of claim 7, wherein selecting the second plurality of time-domain synchronization sequences from a first plurality of time-domain synchronization sequences through the coarse synchronization process comprises one of the following steps:
based on the coarse synchronization result, determining a group of time-domain synchronization sequences from R groups of time-domain synchronization sequences obtained by dividing the first plurality of time-domain synchronization sequences according to R, and compensating the determined group of time-domain synchronization sequences based on the coarse synchronization result as the second plurality of time-domain synchronization sequences; and
based on the coarse synchronization result, determining a first group of time-domain synchronization sequences from R groups of time-domain synchronization sequences obtained by dividing the first plurality of time-domain synchronization sequences according to R, and taking the first group of time-domain synchronization sequences as the second plurality of time-domain synchronization sequences.

9. The method of claim 8, wherein the step of determining the second synchronization delay part based on the second plurality of time-domain synchronization sequences and one of the first received signal and the compensated first received signal, depending on which one of the first transmitted signal and the first received signal is compensated comprises one of the followings:
in case that the second plurality of time-domain synchronization sequences have been compensated based on the coarse synchronization result, depending on which one of the first transmitted signal and the first received signal is compensated, determining the second synchronization time delay part according to one time-domain synchronization sequence which has a largest correlation peak value with one of the first received signal and the compensated first received signal among the second time-domain synchronization sequences;
in case that the second plurality of time-domain synchronization sequences are not compensated based on the coarse synchronization result, depending on which one of the first transmitted signal and the first received signal is compensated, determining the second synchronization delay part according to one time-domain synchronization sequence having a correlation peak value with a signal obtained by compensating one of the first received signal and the compensated first received signal based on the coarse synchronization result among the second time-domain synchronization sequences.

10. The method of claim 8, wherein the step of determining the second synchronization delay part based on the second plurality of time-domain synchronization sequences and one of the first received signal and the compensated first received signal, depending on which one of the first transmitted signal and the first received signal is compensated comprises:
determining channel estimation matrices corresponding to each time-domain synchronization sequence of the second plurality of time-domain synchronization sequences;
determining a residual self-interference caused by the second synchronization delay part corresponding to each time-domain synchronization sequence; and
determining the second synchronization delay part based on a time-domain synchronization sequence with a smallest residual self-interference among the second plurality of time-domain synchronization sequences, wherein
the step of determining the residual self-interference caused by the second synchronization delay part corresponding to each time-domain synchronization sequence comprises one of the followings:

in case that the second plurality of time-domain synchronization sequences have been compensated based on the coarse synchronization result, determining the residual self-interference caused by the second synchronization delay part corresponding to each time-domain synchronization sequence, based on each time-domain synchronization sequence and one of the first received signal and the compensated first received signal, depending on which one of the first transmitted signal and the first received signal is compensated; and in case that the second plurality of time-domain synchronization sequences have not been compensated based on the coarse synchronization result, determining the residual self-interference caused by the second synchronization delay part corresponding to each time-domain synchronization sequence, based on a signal obtained by compensating one of the first received signal and the compensated first received signal based on the coarse compensation result and each time-domain synchronization sequence, depending on which one of the first transmitted signal and the first received signal is compensated.

11. The method of claim 2, wherein the step of determining the second synchronization delay part comprises:

determining an average value of frequency-domain autocorrelation matrices of at least two extracted subcarriers obtained by extracting from a plurality of subcarriers used for transmitting a second transmitted signal at equal intervals as an average autocorrelation matrix;

determining the second synchronization delay part based on singular value decomposition of the average autocorrelation matrix.

12. The method of claim 1, wherein the step of compensating the first transmitted signal according to the first synchronization delay part comprises one of the followings:

performing time-domain cyclic shift on the first transmitted signal based on the determined first synchronization delay part; and performing frequency-domain phase compensation on the first transmitted signal based on the determined first synchronization delay part.

13. The method of claim 1, wherein the step of compensating the first received signal according to the first synchronization delay part comprises:

changing a receiving window for the first received signal based on the determined first synchronization delay part.

14. The method of claim 1, further comprising:

for a second transmitted signal transmitted by the device and a second received signal received by the device and corresponding to the second transmitted signal, compensating one of the second transmitted signal and the second received signal according to the synchronization delay determined based on the first synchronization delay part and the second synchronization delay part; and determining a self-interference channel according to one of a collection of the second transmitted signal and the compensated second received signal and a collection of the second received signal and the compensated second transmitted signal, depending on which one of the second transmitted signal and the second received signal is compensated;

reconstructing a self-interference signal based on the determined self-interference channel, and deleting the reconstructed self-interference signal from the received signal.

* * * * *